United States Patent
Salonen

(10) Patent No.: US 9,406,032 B2
(45) Date of Patent: *Aug. 2, 2016

(54) FINANCIAL FRAUD PREVENTION METHOD AND SYSTEM

(75) Inventor: Jukka Salonen, Luhtajoki (FI)

(73) Assignee: BOOKIT OY AJANVARAUSPALVELU, Espoo (FI)

( * ) Notice: Subject to any disclaimer, the term of this patent is extended or adjusted under 35 U.S.C. 154(b) by 83 days.

This patent is subject to a terminal disclaimer.

(21) Appl. No.: 13/332,409

(22) Filed: Dec. 21, 2011

(65) Prior Publication Data

US 2012/0158590 A1 Jun. 21, 2012

Related U.S. Application Data

(63) Continuation-in-part of application No. 13/074,037, filed on Mar. 29, 2011, which is a continuation-in-part of application No. 10/734,352, filed on Dec. 11, 2003, which is a continuation of application No. 10/227,194, filed on Aug. 21, 2002, now Pat. No. 7,406,429.

(60) Provisional application No. 61/318,648, filed on Mar. 29, 2010.

(30) Foreign Application Priority Data

Aug. 21, 2001 (FI) ..................... 20011680

(51) Int. Cl.
*G06Q 10/00* (2012.01)
*G06Q 10/02* (2012.01)
(Continued)

(52) U.S. Cl.
CPC ............ *G06Q 10/02* (2013.01); *G06Q 10/109* (2013.01); *G06Q 20/24* (2013.01); *G06Q 20/40* (2013.01); *G06Q 20/4016* (2013.01); *G06Q 30/06* (2013.01)

(58) Field of Classification Search
CPC ............ G06Q 20/3674; G06Q 20/382; G06Q 20/385; G06Q 20/40; G06Q 20/401; G06Q 20/32; G06Q 20/12; G06Q 2220/00
See application file for complete search history.

(56) References Cited

U.S. PATENT DOCUMENTS 5,592,666 A 1/1997 Perez
5,838,965 A 11/1998 Kavanagh et al.
(Continued)

FOREIGN PATENT DOCUMENTS

CN 1675637 A 9/2005
EP 0881802 A1 2/1998
(Continued)

OTHER PUBLICATIONS bmd wireless AG, Wireless Application messaging server, Unknown 2004.
(Continued)

*Primary Examiner* — George Chen
(74) *Attorney, Agent, or Firm* — Barnes & Thornburg LLP

(57) ABSTRACT

According to an embodiment of the present invention a method for detecting fraudulent use of credit cards is herein described. In the case when possible fraudulent use is detected the issuer or other responsible party, such as a third-party mediator, temporarily blocks the credit card account. This can be accomplished, for example, by making an artificial excess of credit limit of the credit card or otherwise temporarily closing a credit card account. In some embodiments an issuer or responsible party may send a warning message and/or alert to a client's mobile phone informing of an upcoming temporary block of client's credit card.

33 Claims, 17 Drawing Sheets

(51) Int. Cl.
*G06Q 10/10* (2012.01)
*G06Q 20/24* (2012.01)
*G06Q 20/40* (2012.01)
*G06Q 30/06* (2012.01)

(56) References Cited

U.S. PATENT DOCUMENTS

| | | |
|---|---|---|
| 5,940,818 A | 8/1999 | Malloy et al. |
| 5,987,467 A | 11/1999 | Ross et al. |
| 6,003,036 A | 12/1999 | Martin |
| 6,085,100 A * | 7/2000 | Tarnanen ............... 455/466 |
| 6,104,870 A | 8/2000 | Frick et al. |
| 6,134,432 A * | 10/2000 | Holmes et al. ........... 455/412.1 |
| 6,199,076 B1 | 3/2001 | Logan et al. |
| 6,539,360 B1 | 3/2003 | Kadaba |
| 6,560,456 B1 | 5/2003 | Lohtia et al. |
| 6,564,261 B1 | 5/2003 | Gudjonsson et al. |
| 6,625,461 B1 | 9/2003 | Bertacchi |
| 6,639,919 B2 | 10/2003 | Kroninger et al. |
| 6,772,336 B1 | 8/2004 | Dixon, Jr. |
| 6,990,332 B2 | 1/2006 | Vihinen |
| 7,149,537 B1 | 12/2006 | Kupsh et al. |
| 2001/0037264 A1 | 11/2001 | Husemann et al. |
| 2001/0049785 A1 | 12/2001 | Kawan et al. |
| 2002/0028686 A1 | 3/2002 | Kagi |
| 2002/0032589 A1 | 3/2002 | Shah |
| 2002/0059146 A1* | 5/2002 | Keech ............... 705/64 |
| 2002/0080822 A1 | 6/2002 | Brown et al. |
| 2002/0104007 A1 | 8/2002 | Moodie et al. |
| 2002/0111914 A1 | 8/2002 | Terada et al. |
| 2002/0165000 A1 | 11/2002 | Fok |
| 2002/0173319 A1 | 11/2002 | Fostick |
| 2002/0180696 A1 | 12/2002 | Maritzen et al. |
| 2002/0184509 A1 | 12/2002 | Scheidt et al. |
| 2002/0188562 A1 | 12/2002 | Garashi et al. |
| 2002/0191795 A1* | 12/2002 | Wills ............... 380/270 |
| 2003/0005126 A1 | 1/2003 | Schwartz et al. |
| 2003/0101071 A1 | 5/2003 | Salonen |
| 2003/0163536 A1 | 8/2003 | Pettine, Jr. |
| 2003/0211844 A1 | 11/2003 | Omori |
| 2004/0128158 A1 | 7/2004 | Salonen |
| 2004/0128173 A1 | 7/2004 | Salonen |
| 2004/0139318 A1 | 7/2004 | Fiala et al. |
| 2004/0157628 A1 | 8/2004 | Daniel et al. |
| 2004/0185883 A1 | 9/2004 | Rukman |
| 2004/0198322 A1 | 10/2004 | Mercer |
| 2005/0027608 A1 | 2/2005 | Wiesmuller et al. |
| 2005/0054286 A1 | 3/2005 | Kanjilal et al. |
| 2005/0065995 A1 | 3/2005 | Milstein et al. |
| 2005/0102230 A1 | 5/2005 | Haidar |
| 2005/0171738 A1 | 8/2005 | Kadaba |
| 2005/0246209 A1 | 11/2005 | Salonen |
| 2005/0268107 A1* | 12/2005 | Harris et al. ............. 713/182 |
| 2006/0010085 A1 | 1/2006 | McMeen et al. |
| 2006/0040682 A1 | 2/2006 | Goertz et al. |
| 2006/0075139 A1 | 4/2006 | Jungck |
| 2006/0131385 A1* | 6/2006 | Kim ............... 235/379 |
| 2006/0224407 A1 | 10/2006 | Mills |
| 2006/0271551 A1 | 11/2006 | Suojasto |
| 2007/0010266 A1 | 1/2007 | Chaudhuri |
| 2007/0047533 A1 | 3/2007 | Criddle et al. |
| 2007/0135101 A1 | 6/2007 | Ramati et al. |
| 2007/0143230 A1 | 6/2007 | Narainsamy et al. |
| 2008/0147408 A1 | 6/2008 | Da Palma et al. |
| 2008/0317224 A1 | 12/2008 | Salonen |
| 2009/0281929 A1 | 11/2009 | Boitet et al. |

FOREIGN PATENT DOCUMENTS

| | | |
|---|---|---|
| EP | 0967754 A2 | 12/1999 |
| EP | 1546938 | 8/2002 |
| EP | 1458201 A1 | 9/2004 |
| FI | 20011680 | 2/2003 |
| FI | 000117663 B1 | 12/2006 |
| FI | 20060387 | 10/2007 |
| FI | 000118586 B | 12/2007 |
| GB | 2391646 A | 11/2004 |
| GB | 2435565 A | 8/2007 |
| KR | 20040013261 A | 2/2004 |
| WO | 97/06603 A2 | 2/1997 |
| WO | 00/41102 A2 | 7/2000 |
| WO | 00/52601 A1 | 9/2000 |
| WO | 01/39099 A1 | 5/2001 |
| WO | 01/53991 A1 | 7/2001 |
| WO | 2006122399 A1 | 11/2006 |
| WO | 2007063179 A1 | 6/2007 |
| WO | 2007122292 A1 | 11/2007 |
| WO | 2007125171 A1 | 11/2007 |
| WO | 2008017695 A2 | 2/2008 |
| WO | 2010000949 A1 | 1/2010 |

OTHER PUBLICATIONS

Content Gateway, Version 4.0. "Development and Billing manual," Jan. 1, 2005, Telia Sonera Finland Oy, www.sonera.fi/files/sonera.fi/.

Elisa Plc's press release. "Bookit Ltd and Elisa implement a handy mobile phone-enabled check-in service for Finnair," Jun. 9, 2004, www.elisa.fi.

Elisa Plc's press release. "Innovative solution receives 2004 European Good PRactice Award in oppupational health and safety," and the appendix: "BookIT case.pdf," Nov. 22, 2004.

Empower Interactive Group Ltd. "Virtual Mobile Redirector—Product Information Document," Unknown 2001.

Finnair Plc's press release. "Finnair to introduce the world's easiest check-in-with a text message," Jun. 9, 2004, www.bookit.net/news.

Finnish Search Report, dated May 4, 2006.

Finnish Search Report, dated Jun. 3, 2009.

Penttinen, J. "GSM-tekniikka, WSOY," Unknown 1999, pp. 155-157, 222, & 331-332, Porvoo.

Kauppalehti, "Mobiilipalvelujen oltava yksinkertaisia: BookIT:n Jukka Salonen uskoo tavallisiin tekstiviesteihin," Heikki Nenonen, Jun. 9, 2005, p. 19.

Mouly et al. "The GSM System for mobile Communications," Unknown 1992, pp. 556-560, Palaiseau.

Mobileway, "Mobileway launches is Mobile Transaction Tracker solution—an interactive platform to authenticate macropayment made by mobile consumer," http://www.mobileway.com/pages/newsevents/pressrelease, Mobileway, 2002, pp. 1-2.

\* cited by examiner

FINANCIAL FRAUD PREVENTION METHOD AND SYSTEM

FIELD OF THE INVENTION

The present invention relates to telecommunications. In particular, the invention relates to a method and system for authentication and/or verification via telecommunications.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

Additionally, such services as well as other services/companies such as banks and credit card companies have long had the problem of verifying that the user attempting to make a reservation, booking or purchase is the actual user that they claim to be. Similarly, customers would like to know that the information that they are providing to these services/companies is going to the actual company and that their information is secure. With identity fraud resulting from submitting personal information over the internet being a concern for many web users there exists the need for a safer authentication alternative than currently exists.

Companies and organizations, such as software developers and pharmaceutical companies, have for a long time dealt with the problem of piracy. Not only are such entities harmed by lost sales from counterfeit goods but consumers who unknowingly purchase counterfeit goods can be harmed by, for example, malware installed by hacked software or poor quality and mislabeled counterfeit drugs. Currently, such companies are trying to develop methods in which the authenticity of their products can be easily determined by their customers either prior to purchase or prior to use.

For services such as booking or calendar functions, information exchange often takes place as synchronizing booking or calendar entries. For that purpose, several important standardization efforts are going on. For example, SyncML is an industry initiative to develop and promote a single, common data synchronization protocol. vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

A common problem with all of these existing solutions is that they do not provide common semantics for different systems and the transfer of information may not always be as secure, or at least perceived as secure by customers, as many customers wish. Another problem is that booking systems have multiple different and usually quite complex user interfaces. If a customer wants to both make an appointment with a dentist and book a taxi to take him or her there, the customer needs to enter all the booking information to both booking systems in different ways. While the dentist may have in place a secure method of making reservations, authenticating the client who makes the reservation and receiving payment for a booking, the taxi company may not.

Additionally, it becomes challenging to manage client replies for instance when a client has been given a number of questions. For example, it makes sense to use SMS text messages to ask a client which option he or she chooses, because in many countries, like in Finland, it is very common to communicate with SMS text messages and they create revenues to operators. However, if a client replies to several inquires by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

Other problems, such as clients not showing up for appointments, not using a service more than once or long intervals between use of a service can be addressed through the use of new systems and methods.

SUMMARY OF THE INVENTION

The object of the invention is to provide a method and system capable of authenticating transactions involving at least one service provider and one or more users who are each communicating electronically.

It is an aspect of certain embodiments of the invention to provide a method and system capable of detecting credit card fraud attempts from real credit purchases involving, for example, at least one issuer, one service provider and one or more users who are each capable of electronic communication.

It is a further aspect of certain embodiments of the invention to provide a method and system capable of temporary closing one or more users' credit card or cards. Furthermore, it is an aspect of some embodiments of the invention to further provide for reactivating one or more existing credit cards after authenticating transactions involving, for example, at least one issuer, one service provider and one or more users who are each communicating electronically. Furthermore, it is an aspect of some embodiments of the invention to further provide for registration one or more existing credit cards in connection with user's mobile terminal device and/or communication address related thereto.

It is an aspect of certain embodiments to provide a method and system capable of making booking type transactions between a plurality of service providers and a plurality of users who are each communicating with a mobile telephone capable of receiving and sending short text messages (e.g., SMS messages).

It is a further aspect of certain embodiments where the transaction is an authentication and/or verification of an entity. Examples of such entities are products, actions and users.

It is yet a further aspect of certain embodiments for the method and system to be used to augment a transaction for the benefit of the service provider. For instance, when a software developer releases a free trial version of a product to a plurality of users they often expect around 3% of those downloads to turn in to actual sales of the product. Through implementations of the embodiments of the present invention, the service provider can utilize SMS communication with the users who downloaded the trial to entice use and purchase of the paid program.

BRIEF DESCRIPTION OF THE DRAWINGS

In the following section, the invention will be described in detail by the aid of a few examples of its embodiments, in which.

DESCRIPTION OF THE INVENTION

Figure 1:
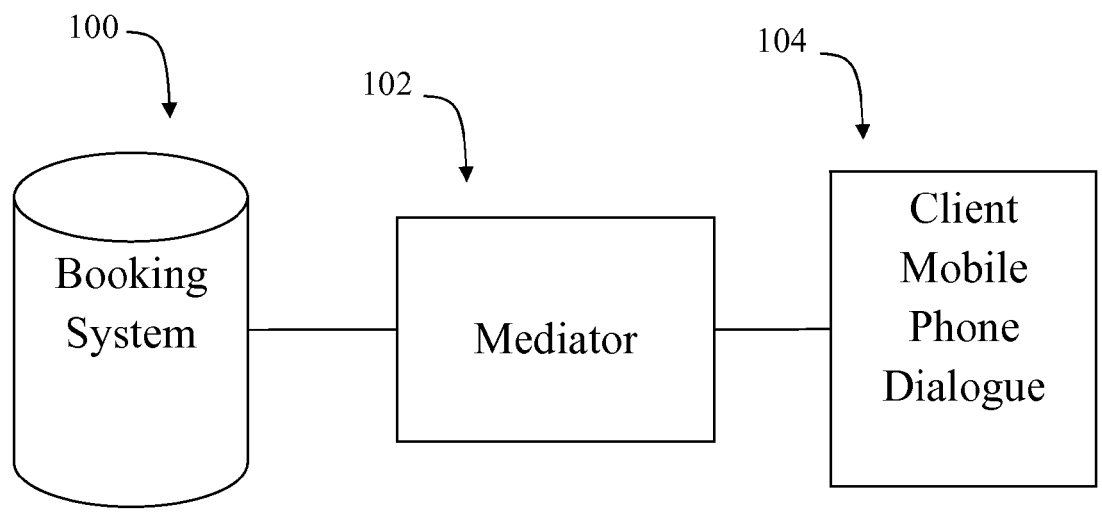
FIG. 1 represents one advantageous system in accordance with an embodiment of the invention.

Certain embodiments of the present invention relate to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

The booking system in accordance with embodiments of the present invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and a well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a clients need, for example coordination of an airline booking with transportation to the airport.

FIG. 1 is a diagram of the simplest system comprising a single service provider booking system 100 for a single service provider, a mediator 102 communicating with the service provider over a network, and a user with a mobile phone having a dialogue entered thereon.

Figure 2:
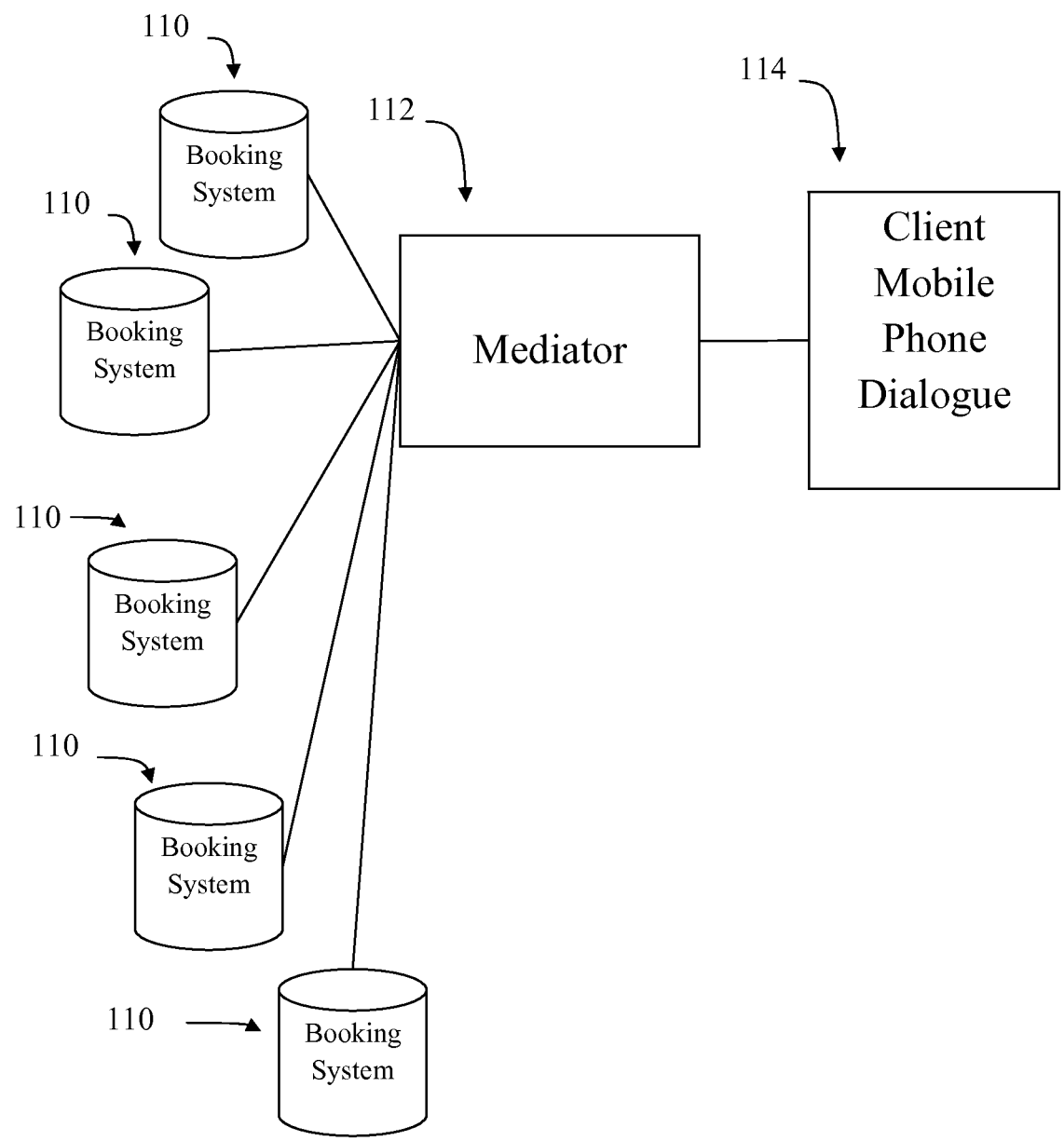
FIG. 2 represents a second advantageous system in accordance with an embodiment of the invention.

FIG. 2 shows a plurality of service provider booking systems communicating with a mediator over a network.

Figure 3:
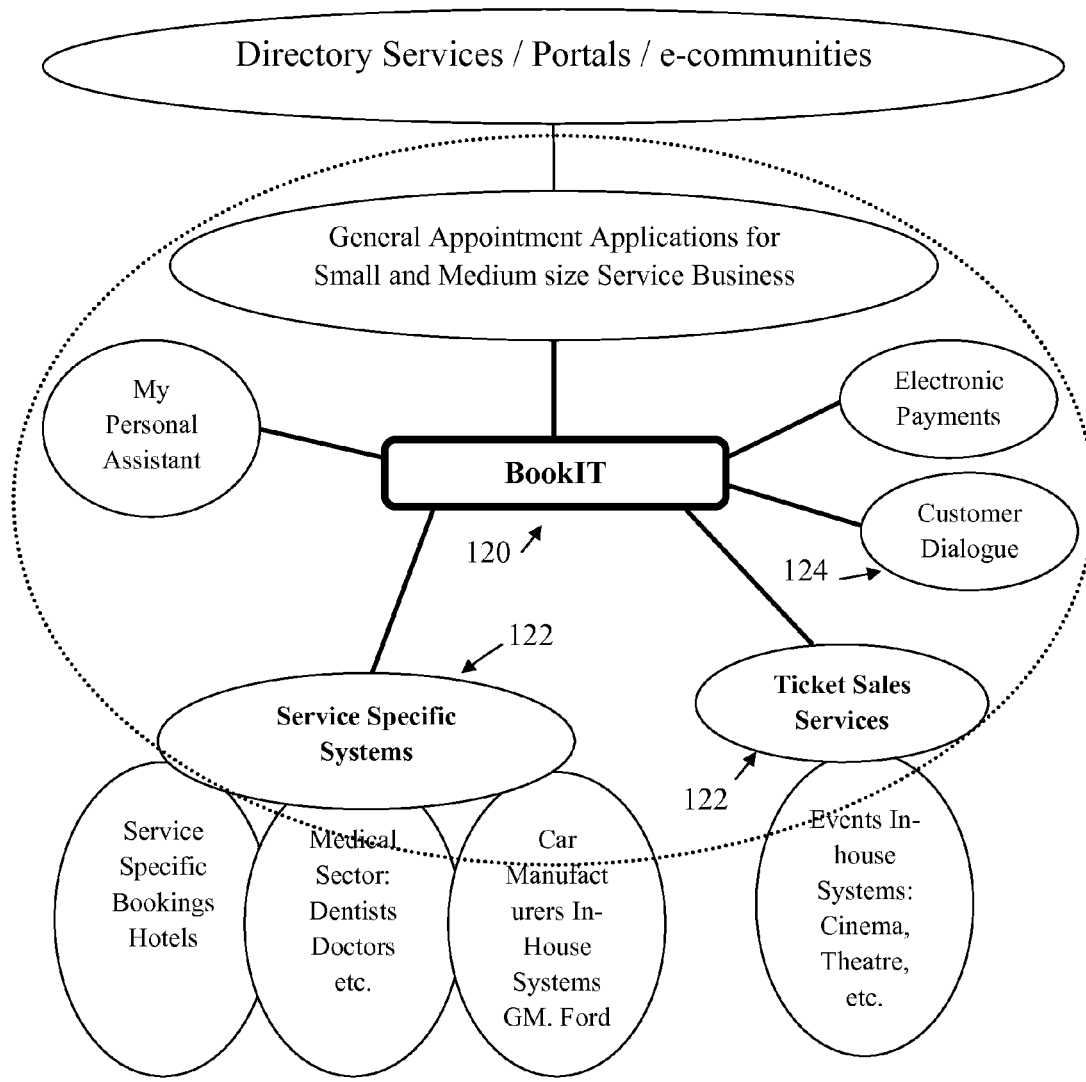
FIG. 3 represents a third advantageous system in accordance with an embodiment of the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels:

1. There is a predetermined set of dialogues in the system. Their content and the possible choices are set in advance. For example, if a client books a flight, a dialogue always offers certain other bookings. Client's prior actions are not taken into consideration.

2. There is an unlimited number of dynamic or "intelligent" dialogues that are based on, for instance, a profile that a client has created himself or herself, usage history records, and client's location. Simple logic supports decisions. It is a low-level expert system.

3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client do not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
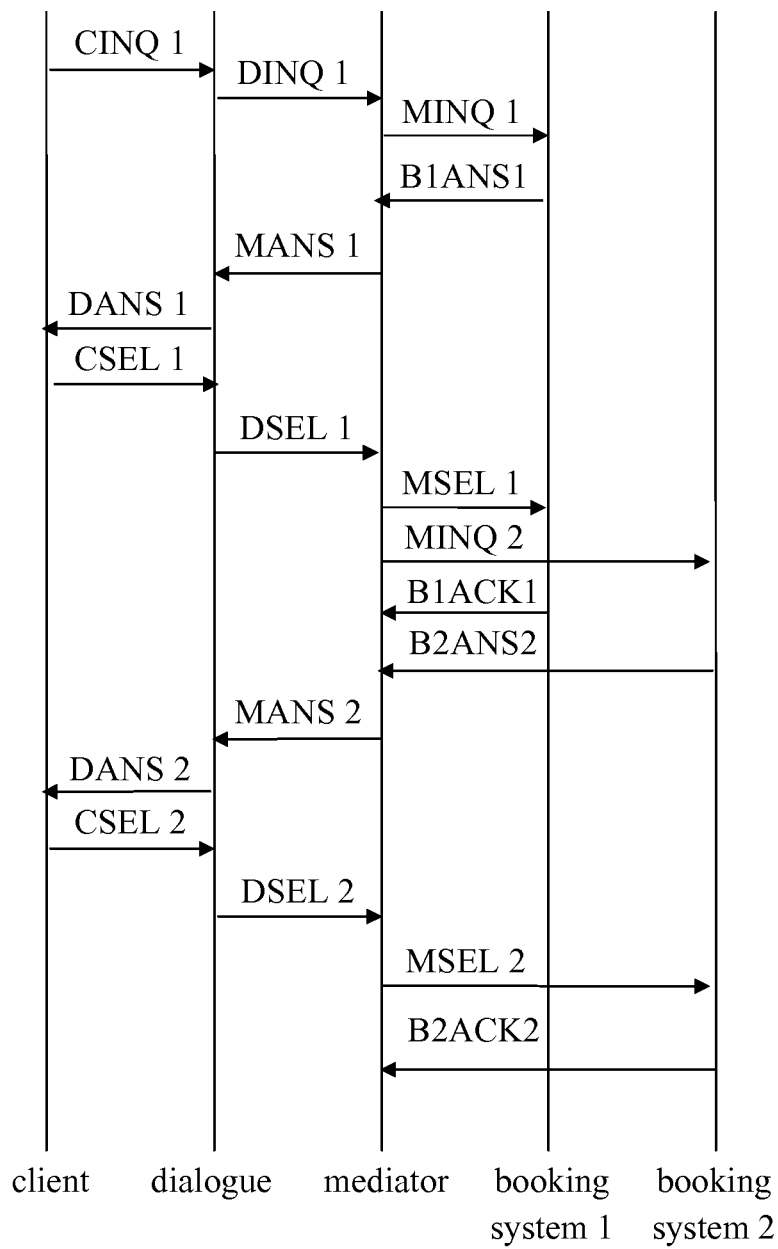
FIG. 4 is one advantageous example of a sequence diagram representing messages transmitted within a system in accordance with an embodiment of the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
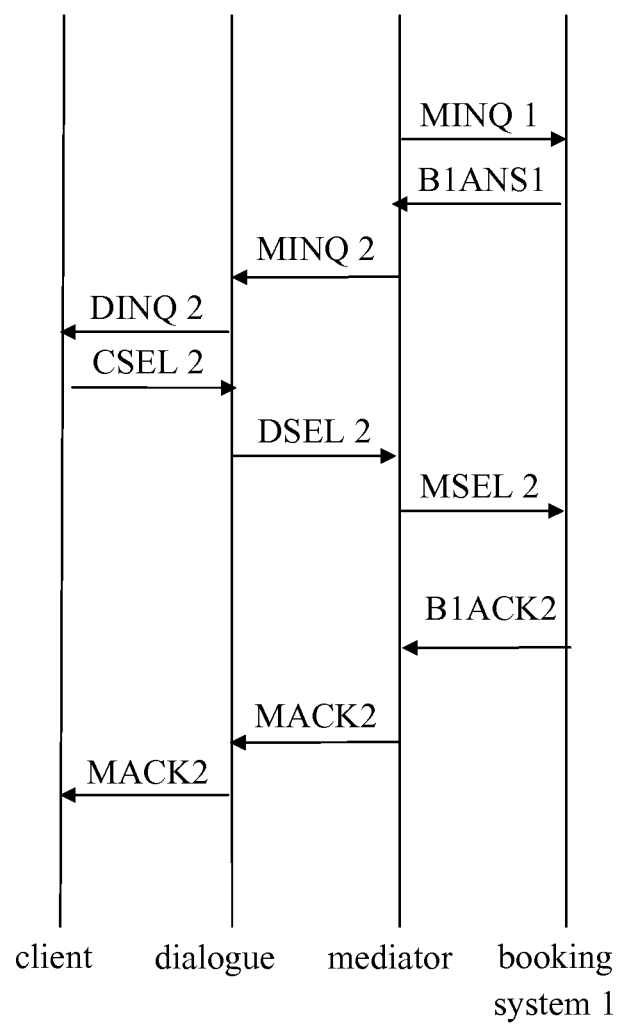
FIG. 5 is a second advantageous example of a sequence diagram representing messages transmitted within a system in accordance with an embodiment of the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQ1, was initiated by the mediator.

EXAMPLE 1

A Preferred Booking System

A preferred booking system according to the invention is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed:
a suggested start-time (ISO time-stamp w/time zone)
b suggested start-location (coordinates)
c suggested end-time (ISO time-stamp w/time zone)
d suggested end-location (coordinates)

4. Confirming

Time and location as it is accepted by the resources that have accepted. Data related to this phase:
a accepted start-time (ISO time-stamp w/time zone)
b accepted start-location (coordinates)
c accepted end-time (ISO time-stamp w/time zone)
d accepted end-location (coordinates)
By default the data is copied from the Planning phase.
In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed:
a actual start-time (ISO time-stamp w/time zone)
b actual start-location (coordinates)
c actual end-time (ISO time-stamp w/time zone)
d actual end-location (coordinates)
e products used, extras, mileage, . . . .
By default the data is copied from the Confirming phase.

6. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| Phase/Data | Identifying | Resources | Suggested time | Accepted time | Task's work related | Accounting | Closing |
|---|---|---|---|---|---|---|---|
| Filing | X | | | | | X | |
| Requesting | X | X | | | | X | |
| Scheduling | X | X | X | | | X | |
| Confirming | X | X | X | X | | X | |
| Working | X | X | X | X | X | X | |
| Accounting | X | X | X | X | X | X | |
| Completing | X | X | X | X | X | X | X |

Phase Statuses, Values, and Transitions

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs Action | Needs Action |
| Scheduling | Scheduled | Confirming | Needs Action | Needs Action |
| Scheduling | Re-scheduled | Confirming | Needs Action | Needs Action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |
| Confirming | Re Scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |

-continued

| Phase | Satus | Next Phase | vEvent | vTodo |
|---|---|---|---|---|
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| <Phase y> | Paused | <Status x> |
|---|---|---|
| <Phase y> | Re-started | <Status x> |
| <Phase y> | Cancelled | Accounting |

Figure 7:
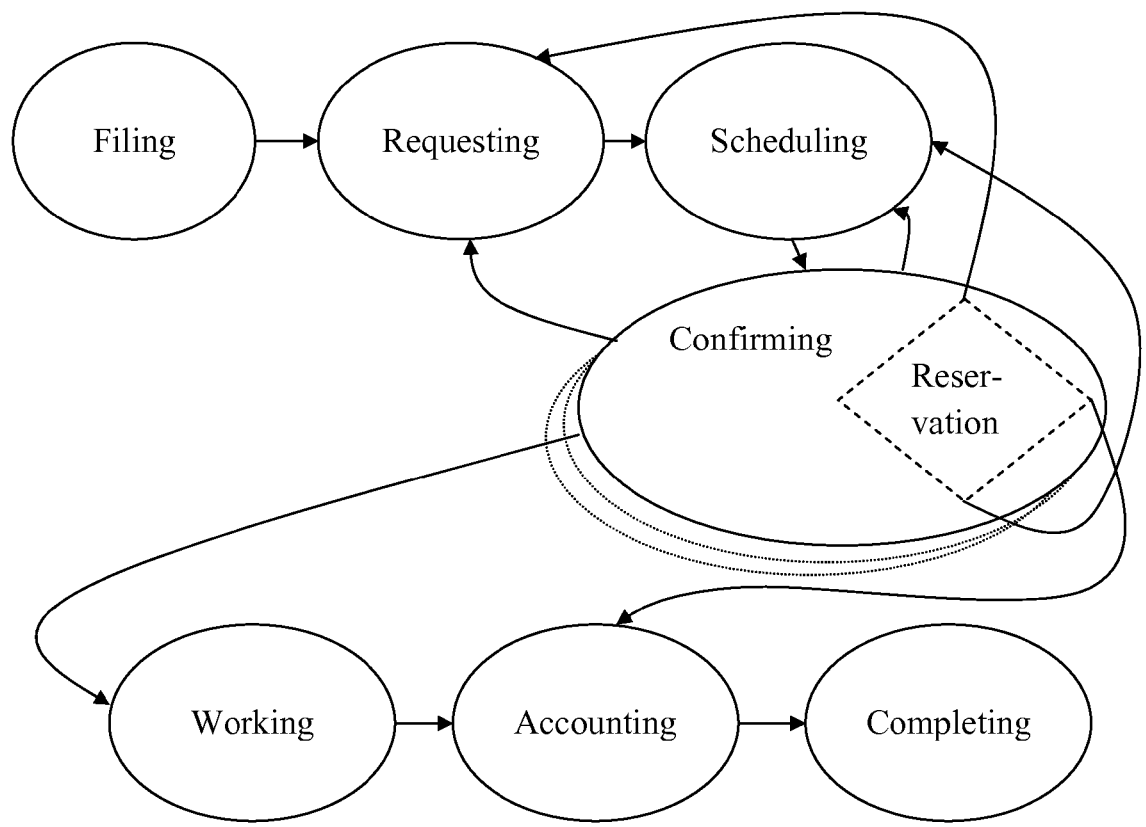
FIG. 7 shows the phases of the booking process in an embodiment of the invention.

FIG. 7 shows the work flow transitions from phase to phase. For conditions, see the table above. Also, please note that Canceled Status always leads to accounting.

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are:

a "NoReplies" (0) for "No-one hasn't replied to the request made by the organizer"

b "NoDeclines" (1) for "Not all invitees have replied yet. The ones who have replied have accepted"

c "AllAccepts" (2) for "all invitees have confirmed"

d "SomeDeclines" (3) for "Some of the invitees have declined"

e "AllDeclines" (4) for "All of the invitees have declined".

The following decision table helps in evaluating the status of the whole booking. "Maybe" means that this condition only does not incontestably specify true or false result.

| Booking Status | Confirmations | | | | | | |
|---|---|---|---|---|---|---|---|
| | No one answered | No one accepted | Some accepted | All accepted | No one declined | Some declined | All declined |
| NoReplies | True | Maybe | | | Maybe | | |
| NoDeclines | True | Maybe | Maybe | True | True | | |
| NoAccepts | True | True | | | Maybe | Maybe | True |
| AllAccepts | | | True | True | Maybe | | |
| SomeAccepts | | | True | Maybe | Maybe | Maybe | |
| AllDeclines | | Maybe | | | | | True |
| SomeDeclines | | Maybe | Maybe | | | True | Maybe |

Based on the information and decision table above the organizer/application has to make the decision of what to do with the reservation. That can be an automatic decision made by the system based on pre-set rules or made by the organizer manually.

Figure 6:
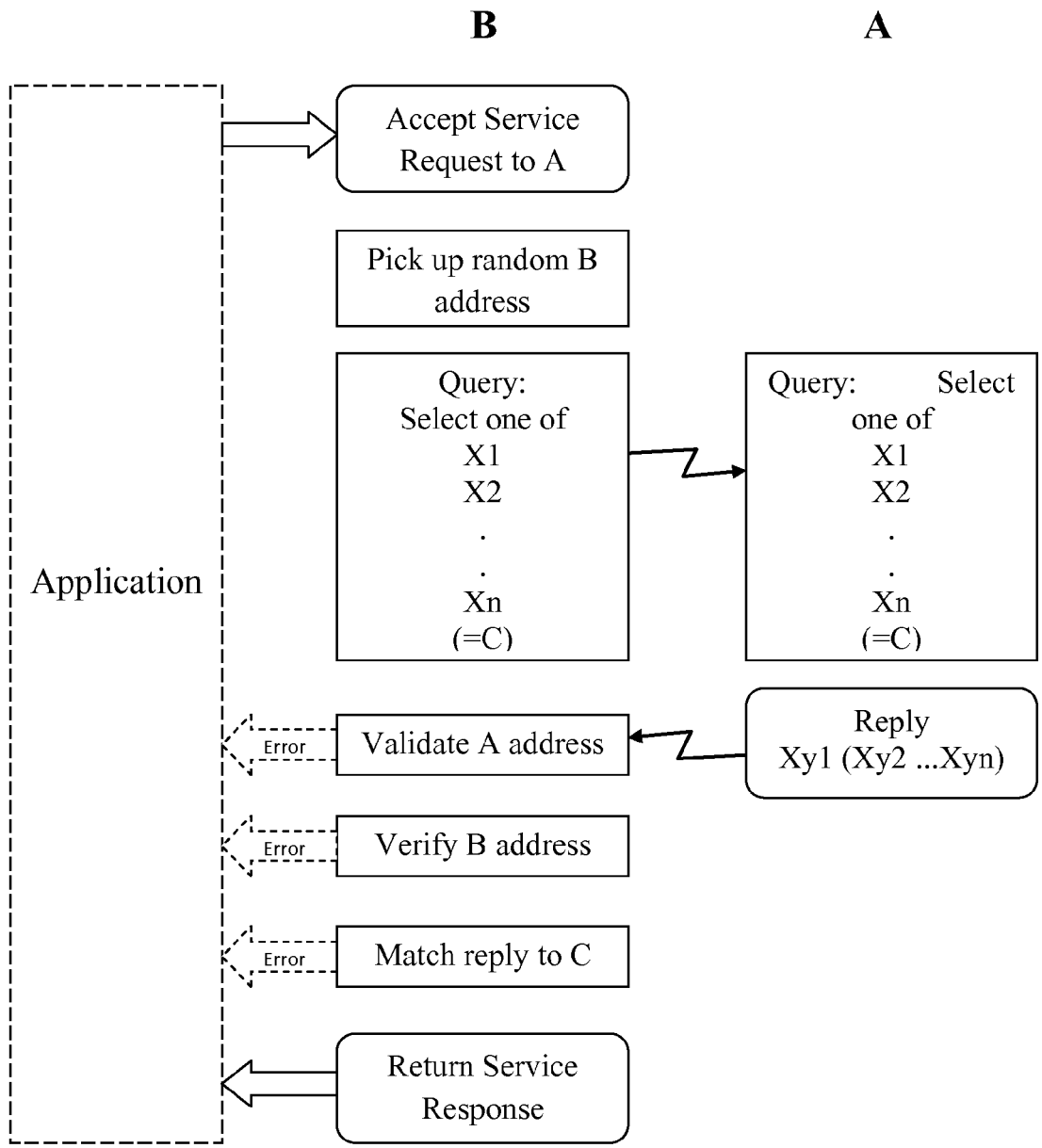
FIG. 6 shows an example of the dynamic dialog matrix applied to a query and reply according to an embodiment of the invention.

FIG. 6 shows an example of the dynamic dialog matrix applied to a query and reply according to the invention. An application sends a service request to a user to a mediator B. The mediator B picks up random B address from a group of available B addresses wherein it can receive responses from the user. After defining the B address, the mediator B sends a query to user A, wherein the query may consist of a list of choices from which the user A may select the reply. The user A receives the query in their terminal and sends a reply to that query to the B address. The mediator B receives the user's reply in the B address. After receiving the reply from the user A, the mediator B processes the reply. First the mediator B validates the A address (which is the user's address). In case the A address does not correspond to the A address whereto the message was sent, the mediator B may inform the application that no response was received. In case the A address corresponds to A address whereto the mediator B has sent a query to, the mediator B verifies the B address (the reply address into which the reply was received). Correspondingly, in case the B address is not a valid B address for the user, the mediator B may inform the application that no response was received. In case also the B address corresponds to the B address that the message was sent from, the mediator B matches the reply C to the list of available choices for that message. If the reply does not correspond to the available list of choices, the mediator B may send an error information to the application, or send a new query to the user A. If the reply corresponds to the available list of choices that was sent to the user, the mediator B sends a return service response to the application.

Preferably, the system with reference to FIG. 6 has a plurality B subscriber numbers (telephone numbers), wherefrom the mediator B may select a subscriber number where the message to the user A is sent. Further, the user A preferably has a mobile telephone, having a mobile subscriber number, whereto the message is sent, and wherefrom the user A may respond to the query. The messages to and from the mediator B is sent over the telecommunication network.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

An example is for authenticating a user who is making a purchase, e.g. purchasing a software product. The user first initiates a purchase request to the company/service, e.g. directly in the software program, via an internet website or via a mobile device. The company/service then knows the user name and possible other identification information and sends a request to a credit card company to request a payment. The credit card company then sends a request to a mediator to authenticate the purchase. The mediator knows the user and the user's mobile number and sends a message, e.g. SMS or MMS, to the user's known phone number. An example of a message could be:

Dear Mr. Salonen, your credit card was used to purchase Office on 27 Mar. 2010 for 299 euros. Please reply y—to accept the payment on VISA xxxx xxxx xxxx 123 n—to reject the payment or f—to report a fraud on your credit card.

By responding to the message from the known user's mobile number with an acceptable response allows the mediator to respond to the credit card company if the user authorizes the purchase or not. Thereafter, the credit card company may authorize the payment and inform the company/service. Additionally, if the mediator sends the message from a randomly chosen reply number as discussed above, there is an added layer of authentication. Because it is possible for a fraudulent user to determine a credit card holder's mobile number and fake a message from said number, it would be extremely improbable for them to know which reply number the authentication message would originate from. The above may also be used, for example, with money transfers between a user's bank and the company/service.

An additional element of security can be achieved using semantic analysis. For example, if the user is asked to tell how many items are ordered, and the answer is "yes", then apparently the user did not know what the question was and the message was not an answer for the enquiry.

Such a system can also provide a level of security for the user. The mediator can authenticate the company/service, by any acceptable method, and only send authentication messages once the company/service has been authenticated. Then, if the user does not provide their mobile number when providing their identification information, when they get an authentication message, even from a number they do not recognize, they will know that the mediator has authenticated the company/service.

While the present example has been explained in terms of the mediator sending the message, the message could be sent by a secondary entity at the request of the mediator. For example, when the mediator receives a request to authenticate a transaction, the mediator can then provide the user's bank with the necessary transaction details and request that the bank send the necessary authentication method. Another example would be if the mediator sends a request to the bank for some of the user's identity information, e.g. mobile number, so that it can proceed with sending the actual request itself or through a tertiary service provider which handles the actual message sending.

Additionally, though the present example has been described with the transaction being the purchase of a product and authentication of the user for payment, the same system and similar method can be used for other transactions, such as the authentication of the purchased product.

The use of a Dynamic Dialogue Matrix allows for authentication and verification of products, services and transactions based on a plurality of combinations of data. Based on as little as two pieces of information from the DDM an entity can be verified. Based on more pieces of information from the DDM, a higher degree of verification can be achieved.

A DDM which is being used for verification purposes can contain, or have access to, multiple of some or all of the following: reply addresses used for sending messages, reply addresses for which messages are received, user addresses, questions, acceptable answers for questions, order of receiving answers and verification information (e.g. product keys, ID codes). A key to the DDM is that it allows verification between a company/service and a user through a mediator (and possibly another party) by matching information that each entity knows and the others should not know. Several examples are as follows:

If a user downloads a piece of software from the internet they want to know that the software is legitimate, i.e. not pirated or hacked and software developers want to make sure that users are paying to activate their programs. Therefore, prior to use the user is requested to enter a product key. The user sends a message, e.g. SMS, to a number with a product ID code. If the ID code is valid and has not been previously registered then the user receives a message with the product key. Therefore, the DDM matches the user entered product ID code with an indicator if it has been registered to verify if a product key should be issued. A similar process could work in conjunction with the payment process described above. Once the purchase of the software is authenticated as described above then an additional message can be sent to the user with the applicable product key.

A similar method and system can be used to verify the legitimacy of virtually any product, such as medicine or trademarked products. If the product has a code printed on the packaging and a known number associated with the products manufacturer or verification then a consumer can send a message to the known number with the product code to receive an indication if the code is valid and if it has been previously checked. Benefits to this system are that if pirated products do not have a code printed on the product or have an invalid code then the user will know right away. Additionally, if multiple users check the same code then the product manufacturer or verifier can check in to if the code has been reproduced by a manufacture of a pirated product. A further benefit to the system is that the product manufacturer can immediately send an inquiry back to the user if the product is determined to be pirated or suspected of piracy. An inquiry may be to ask where/when the product was purchased, what the purchase price was and/or other information which can be used to identify the entity responsible for the piracy or distribution of pirated goods.

The process may also be such that the user sends a code to the known number to receive information if the product is authentic or a pirate product. Thereafter, the manufacturer requests a further code or alike information from the user. When using two pieces of information (and possibly another sender identity than whereto the user sent the first message) to authenticate the product, the level of security is increased.

Furthermore, with regards to the above example of making purchases by using a credit card, debit card, payment card, electronic bank account, mobile purse or like intangible way of using or transferring money; the use of credit cards in particular will be described below. However, similar to the discussion above, other means of making a transaction, as for example enumerated herein, can likewise be applied to the present method and system.

Credit cards have increased their share as a means of payment year by year. Point of sale (POS) shopping on the internet has also increased drastically and is currently a large marketplace. Together this growth has led to a situation where all participants (i.e. buyers, customer; sellers, service providers; money including payment card issuers and purchase involved acquirers) of the shopping process can have a virtual presence anywhere in the world.

Electronic shopping, including internet shopping and/or shopping with the aid of any communication networks, has some side effects which challenges secure payments and lures some people to use the systems fraudulently. Moreover, when the number of credit cards increase, unintentional and occasional losses of cards naturally also increases. In these situations, lost cards may be later found by the rightful owner and others will remain lost but not stolen. Another phenomenon is identity crimes, e.g. stealth credit card numbers and information related to its owners which can include social security numbers, card PIN numbers, bank account security codes, etc. In a market where many participants are on the internet shopping becomes easy and convenient but at the same time participants become vulnerable to criminals' actions, such as fraudulent use of payment cards.

Credit card issuers and payment acquirers have developed many methods for detecting possibly fraudulent use. Many of these methods are efficient and derived from accounting information of purchased products and services. For example, there can be continuous computer runs (data-mining) on credit card events in accounting databases which search for possible fraudulent events from all, or a subset of events. In some current ways of detecting fraudulently used credit cards only approximately 10% of the possibly fraudulently used credit card events are actually fraudulent. In the case when a possibly fraudulent use is detected an issuer often tries to call the client and secure the possibility of fraudulent use. In many cases issuers are obliged to deactivate the credit cards due to doubt of fraudulent use. In other words this means that nine out of ten payment card replacements are unnecessary. One replaced payment card can cost its issuer approximately 100 dollars. Worldwide the number of replaced credit cards is in millions per year which leads to an enormous waste to the issuers.

With the aid of the embodiments described herein there is a huge cost savings available for credit card issuers when a significant portion of suspected fraudulently used credit cards do not need to be deactivated and replaced with new ones. Customer loyalty and satisfaction will therefore often increase when a credit card need not be replaced after every suspected fraud case, as may have previously been the case.

Currently, possible fraudulent use of credit cards is detected by back office routines described above. Often in the case when a possible fraudulent event has been detected the issuer tries to contact the card owner with a telephone call. However, it is common where people very often will not answer their phone and especially for phone calls that seems to be coming from an unknown number. Moreover, it is possible that the card owner will be reached only after several hours or even days. For credit card issuers, as a matter of risk management, this is too long of a time period for keeping the credit card active as well as maintaining an open fraud window. Therefore, in these cases, the issuer is obliged to deactivate the card, replace and provide a new card to client. Furthermore, the replacement of a credit card usually takes a couple of working days and sometimes even weeks.

According to an embodiment of the present invention a method for detecting fraudulent use of credit cards is herein described. In the case when possible fraudulent use is detected the issuer or other responsible party, such as a third-party mediator, temporarily blocks the credit card account. This can be accomplished, for example, by making an artificial excess of credit limit of the credit card or otherwise temporarily closing a credit card account. In some embodiments an issuer or responsible party may send a warning message and/or alert to a client's mobile phone informing of an upcoming temporary block of client's credit card.

In many possible fraudulently used credit card events the credit cards need not to be replaced with a new one. This in turn often results in huge cost savings for credit card issuers. Additionally, the fraud window can be minimized and in some cases eliminated. Due to the temporary hold mechanism of credit cards, investigation of possible fraud can be elongated because the credit card is on a hold status and invalid or inactive for any use during this period.

Figure 9:
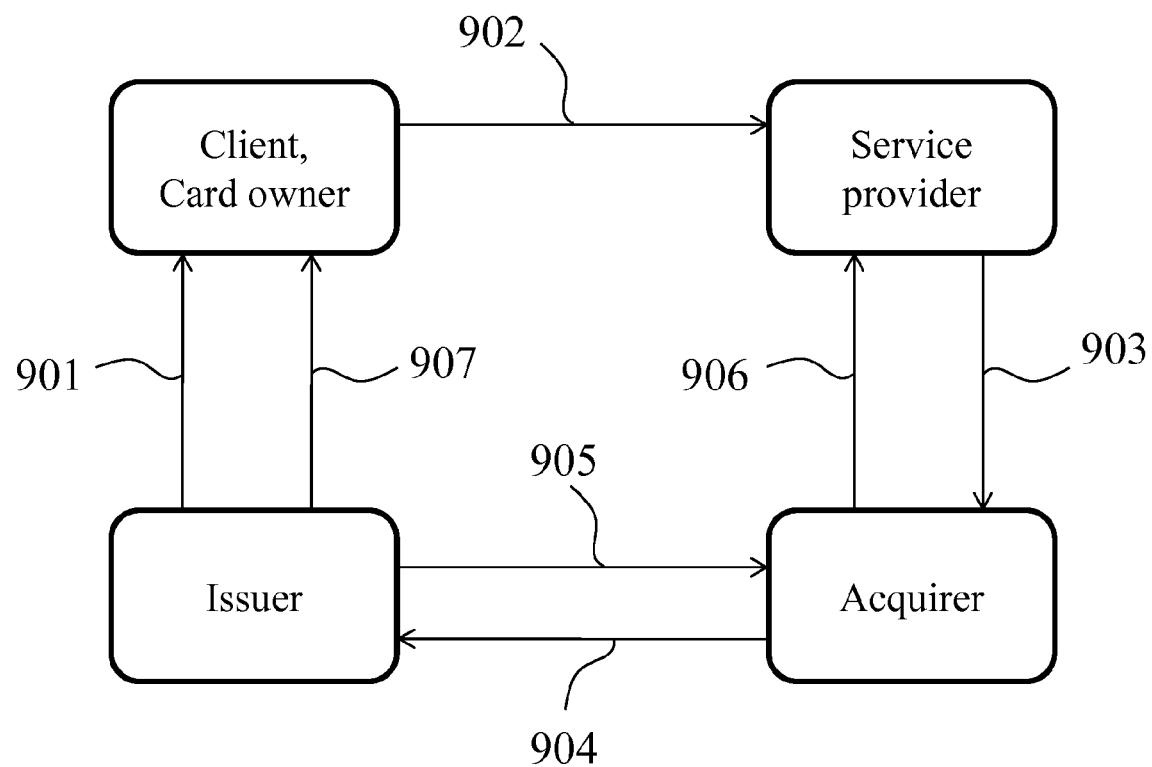
FIG. 9 shows a block diagram of an arrangement of credit card issuance and paying process with credit card.

According to an embodiment of the present invention the following elements are involved:
- a mobile phone of a client with messaging facilities (for example SMS, MMS, email, applet, popup, etc.)
- a client making purchases on the internet with the mobile phone or with a separate terminal, e.g. computer and paying with their credit card
- an issuer which knows the client's mobile phone number/address
  - issuer sending a message to client's mobile phone to confirm the purchase
  - client responding to the issuer's message
- a mediator handling and managing the fraud discussion between the client-issuer and service provider-issuer
  - confirmation message+client's response (fraud suspected)
  - validation message+client's response (purchase bought; possibility to inform fraud)
  - information message
- a mediator controlling/managing the status of credit cards (e.g. means for blocking the credit card temporary)
  - HOLD
  - REACTIVATE
  - DEACTIVATE Referring to FIG. 9, a traditional credit card issuance and paying process is presented. An issuer manages the business of paying using one or more credit cards. Further, the issuer grants one or more credit cards to its clients and guarantees that the service providers will be paid for the products and services bought by the clients. The issuance of a credit card is presented in phase 901 wherein the issuer delivers a credit card or credit card information to its client. With a valid credit card a client can pay for products and services in, for example, shops, restaurants, travel agencies, hotels, car rentals or make shopping on the internet. The issuer may also deliver security codes or similar instructions to clients when paying for purchases.

The paying process of a credit card is presented in phases 902-907. The paying process starts with a phase 902 wherein the client pays for a purchase to a service provider with the credit card. When the client has accepted the purchase the service provider will send the information on the purchase event to its acquirer (phase 903). An acquirer can be, for instance, a local bank or other invoice mediating party. In phase 904 the acquirer sends the information on the purchase event to the issuer. In the next phase 905 the issuer pays the amount of the purchase to the acquirer who pays the correspond sum to the service provider (phase 906). In phase 907 the issuer will invoice the client on the made purchase (phase 907).

This can be situated either as a point-of-sale or on the internet. In both cases a two-factor authentication (TFA) should be executed to client. The two-factor authentication is based on a two-fold concept of "what you have" and "what you know". In a point-of-sale situation the client pays with their credit card ("what you have") and authenticates himself/herself by, e.g. inputting a PIN-number into the payment terminal ("what you know") in the shop. On the internet the risk of fraudulent use of credit cards is much higher because all of the information (even on secured websites e.g. https) is usually transmitted within the same wires or channels. The service provider cannot be sure whether the client has rights to make purchases with the credit card there are using. Furthermore, clients cannot be sure whether the service providers are qualified service providers on the internet. Within certain embodiments of the present invention the service providers can be authenticated.

Figure 10:
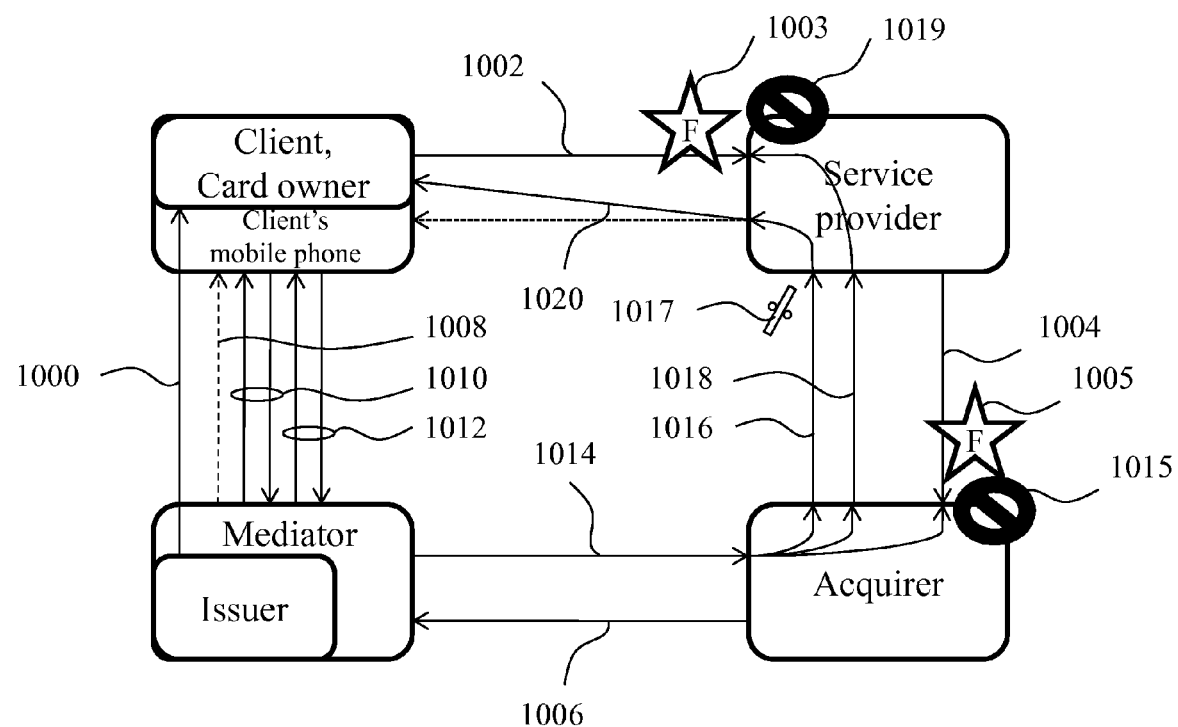
FIG. 10 shows a block diagram of an arrangement of a credit card issuance and paying process with a credit card according to an embodiment of the invention.

FIG. 10 presents a block diagram of an embodiment of the present invention. Compared to the traditional credit card paying process the present process requires that the client has a mobile phone whose number or address is known by the issuer or a responsible third party. Further, a mediator with a Dynamic Dialog Matrix (DDM) as described above and herein is preferably involved. In the present example the mediator is located as a part of issuer's system, however the mediator can be located in a separate part of the system and/or may be controlled by another party.

The issuance of the credit card is presented in the phase 1000 wherein the issuer, or responsible third party, grants and provides a credit card to a client. The client makes purchases from a service provider in phase 1002 and pays the purchase with their credit card. When the client has accepted the purchase the service provider will send the information on the purchase event to service provider's acquirer (phase 1004). An acquirer can be, for instance, a local bank or other invoice mediating party. In phase 1006 the acquirer sends the information on the purchase event to the issuer. In an embodiment of the invention the information on the purchase is transmitted to the mediator which immediately (online), without undue delay, or after back office process investigation sends a notification to the client's mobile phone. The notification can be one-way information (1008) or a dialog (1010) to which an answer from the client is expected. The issuer's mediator can transmit one or several dialogs (1012) to the client for accepting or rejecting the purchase. After the dialog with the client and mediator has finished the mediator decides, based on the client's answers, whether the purchase was right and appropriate such that the mediator gives a response (1014) to acquirer. The response (1014) may include an acceptance on the purchase (1017) which is delivered to the service provider by an acceptance message (1016). After the acceptance 1016 the service provider can be sure that the client has the right to the purchase and the credit card is not deactivated. The service provider delivers the purchase to the client (1020), if not already delivered.

In case the credit card is fraudulently used, for example by a person other than the client (1003), by a service provider without the client's permission (1005) or the buying or paying process is corrupted in some way then the mediator response (1014) includes the information (1018) on the fraudulently used credit card to, for instance, the service provider and the service provider can block the delivery of the purchase to the client (1019), or in the case the delivery has been completed may begin a process for recovering damages. In case the fraudulent use or corrupted process is tracked to the service provider the issuer can block (1015) the service provider's request (1004), for example by informing the acquirer.

Figure 11:
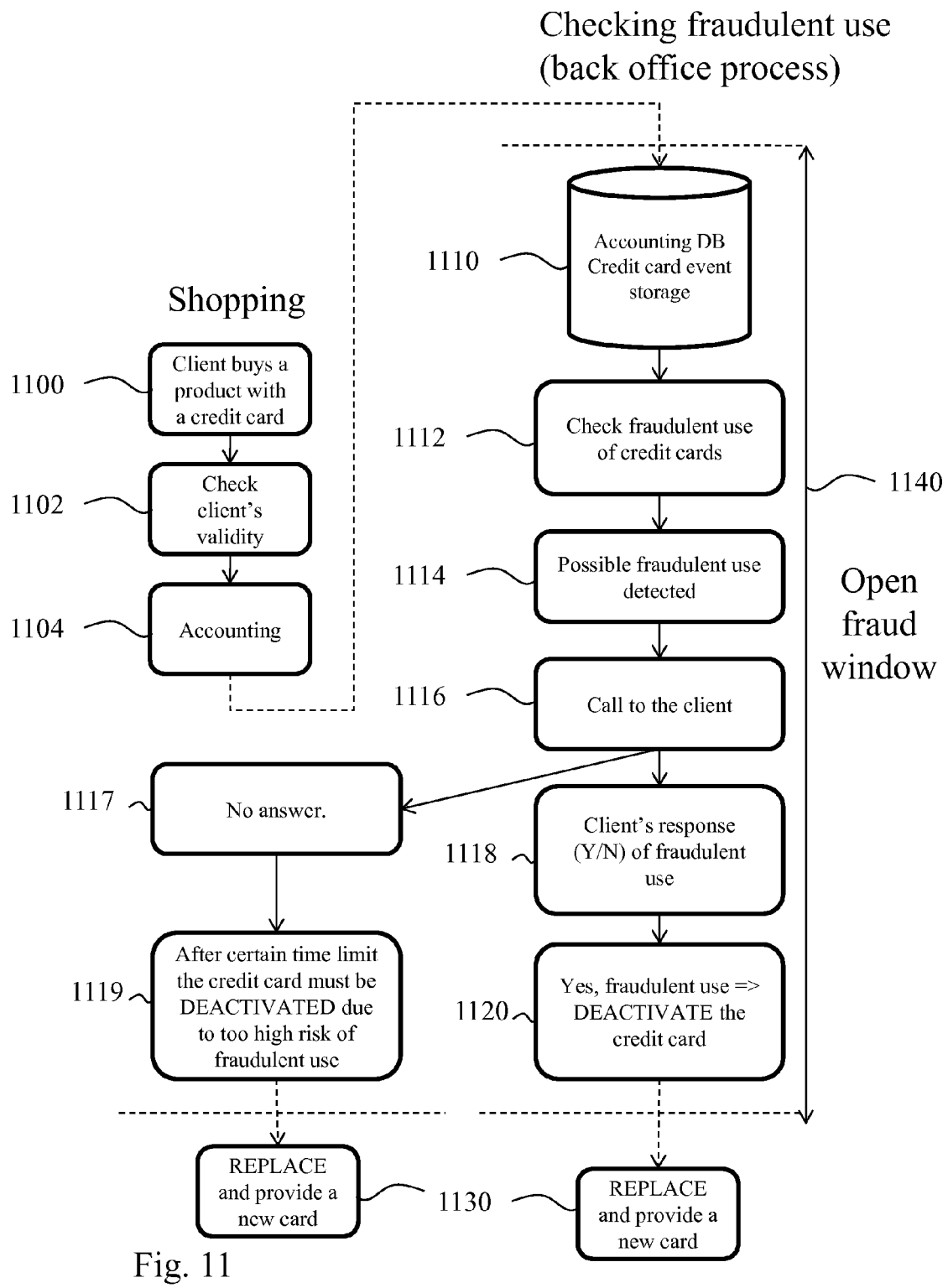
FIG. 11 shows a flow diagram of a credit card paying process and a back office process for checking fraudulent use of credit cards.

Referring to FIG. 11, a traditional credit card paying process together with a back office process of checking fraudulent use is presented. The actual shopping process starts with a phase 1100 when the client buys a product or service with a credit card. In the traditional credit card paying process the client's validity to use the credit is checked (1102). This can be done by giving a PIN-number, similar security code or by other known authentication method. After that the purchase event will be transferred to accounting (1104).

Credit card issuers normally store all purchase events in an accounting database (1110). Fraudulent use of credit cards can be continuously followed-up by a back office process where all of the accounting information on credit card events is scanned against predetermined rules (1112). The predetermined rules may include, for example, when an individual purchase sum exceeds a predetermined limit. Predetermined rules may also include when a credit card has been used geographically within too wide an area in a too short a time limit, which may be an indication of fraudulent use. Further, a change in the shopping behavior compared to earlier use may trigger a fraud investigation. There can be also many other criteria and any combination of them that can be used as a trigger to investigate fraudulent use of credit cards.

When a possibly fraudulent use is detected (1114) the back office process may indicate in the issuer's service centre as an entry in a batch processing list of suspected fraudulent uses. Personnel tasked with monitoring the list may try to clarify whether the fraudulent use has happened. In such cases the personnel, who can be the issuer's or a responsible third parties, may try to call the client to verify the purchases (1116). As described above, this requires a substantial allocation of resources including personnel time and expenses for contacting card holders who in many cases are busy, reluctant to answer their phone or otherwise difficult to reach (1117). In these cases, and especially when the use of credit card continues without attempts to reach the card holder, a time limit (for instance 6-18 hours) forces the issuer to deactivate (1119) the credit card due to the uncertainty of the validness of purchases. In the case where a client is able to be reached then they can indicate whether the fraudulent event has happened or not (1118). In case a fraud has happened the issuer can deactivates (1120) the credit card. In both cases 1119 and 1120 the credit card is deactivated and the issuer shall in many instances replace and provide a new credit card (1130). As can be seen in both cases the fraud window (1140) remains open and makes it possible for fraudulently use of the credit card for a long time, typically several hours.

Figure 12:
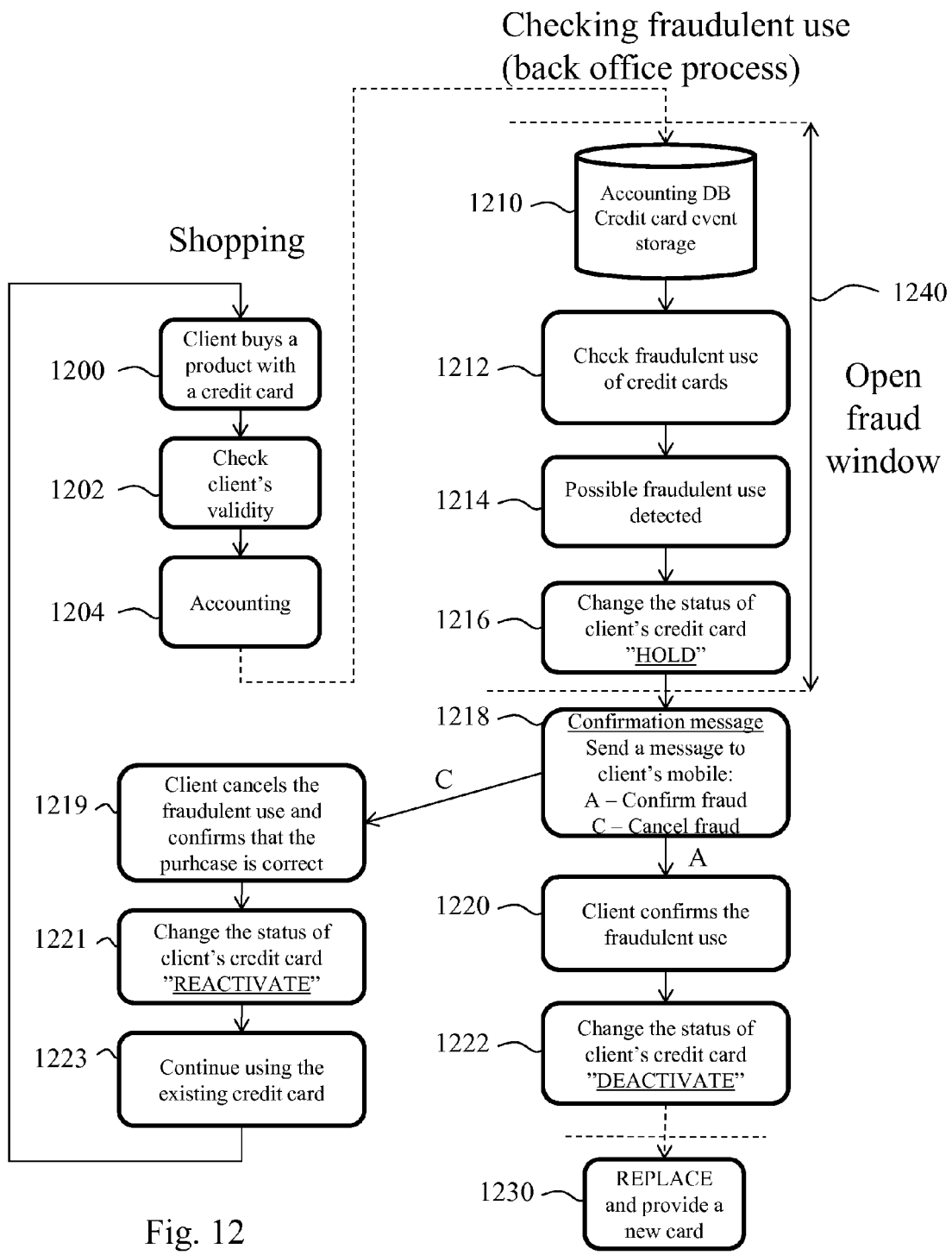
FIG. 12 shows a flow diagram of a credit card paying process and a process for checking fraudulent use of credit cards with an "immediate hold" back office process for temporary blocking option of credit cards according to an embodiment of the invention.

Now referring to FIG. 12 wherein according to an embodiment of the invention the open fraud window (1240) has been shorten drastically compared to the traditional paying process together with a back office process of checking fraudulent use. The actual shopping process starts with a phase 1200 when a client buys a product or service with a credit card. In this example the client's validity to use the credit is checked (1202). This can be done, for example, by giving a PIN-number or similar security code. After that the purchase event will be transferred to an accounting process (1204). It should be noted that this example is possible for point-of-sale as well as internet shopping.

Credit card issuers, or a responsible third party, store all purchase events in an accounting database (1210). Fraudulent use of credit cards is continuously followed-up as described above by a back office process where all the accounting information on credit card events is scanned against predetermined rules (1212). This is a system initiated fraud check process. The predetermined rules may include for example when an individual purchase sum exceeds a predetermined limit. Also when a credit card has been used geographically within too wide an area in a too short a time limit, which may be an indication of fraudulent use. Further, a change in the shopping behavior compared to earlier use may trigger a fraud investigation. There can be many other criteria which are recognized by those of ordinary skill in the art and any combination thereof which can be used as a trigger to investigate fraudulent use of credit cards.

When a possible fraudulent use is detected (1214) the back office process immediately changes (1216) the status of the client's credit card to a "hold" status (or "pending" as described in the example and FIG. 7 above). This action is temporary and normally only valid through the investigation process of fraudulent use. During this period credit cards are at a hold status and invalid or inactive for any normal use (i.e. paying). To change the status to "hold" can be done by several methods. One effective way is to generate an artificial purchase with a sum big enough to excess the credit limit of the credit card account. It should be noted that the credit card is still valid but temporarily unavailable. According to an embodiment a confirmation message (1218) is sent to the client's mobile phone which may have the form of the following example:
Dear Mr. Salonen, your credit card is on hold and temporary unavailable due to suspicion of fraudulent use. Your credit card was used to purchase office supplies on 27 Mar. 2010 for 299 euros. Please reply
a—to confirm the fraud or
c—to cancel the fraud suspicion and accept the payment on VISA xxxx xxxx xxxx 123
In a case where the client responds with ("A") confirming the fraud (1220) the mediator or system behind it will change the status of the credit card by, for instance, deactivating it permanently (1222). There may be still one or more messages, rounds of messages or message pairs for confirming the fraudulent use. After this phase the old credit card will likely become invalid and the issuer will replace and provide a new card to the client (1230).

In case the client responds with ("C") cancelling the fraud (1219) the system will change the status of the credit card by reactivating the credit card as valid (1221). There may be still one or more messages, rounds of messages or message pairs for confirming the cancellation of fraudulent use. After this phase the existing credit card can remain valid and return to be ready for further use immediately or within a short period of time (1223). With the aid of this path, issuers save large amounts of money and resources in these numerous cases where credit cards need only to be reactivated. Furthermore, for embodiments utilizing the mediator and Dynamic Dialog Matrix of the present disclosure this path can be handled in a quick fashion with a high degree of reliability and security for client. The messages in this example can be, for example SMS, MMS, e-mail, calendar reservation, software application, pop-up application or similar immediately available application that can be used within a mobile device such as a mobile or cellular phone.

In the present examples, a typical fraud window (1240) may be limited to only some matter of minutes and the closing of the open fraud window can be completely independent of a client's actions.

Figure 13:
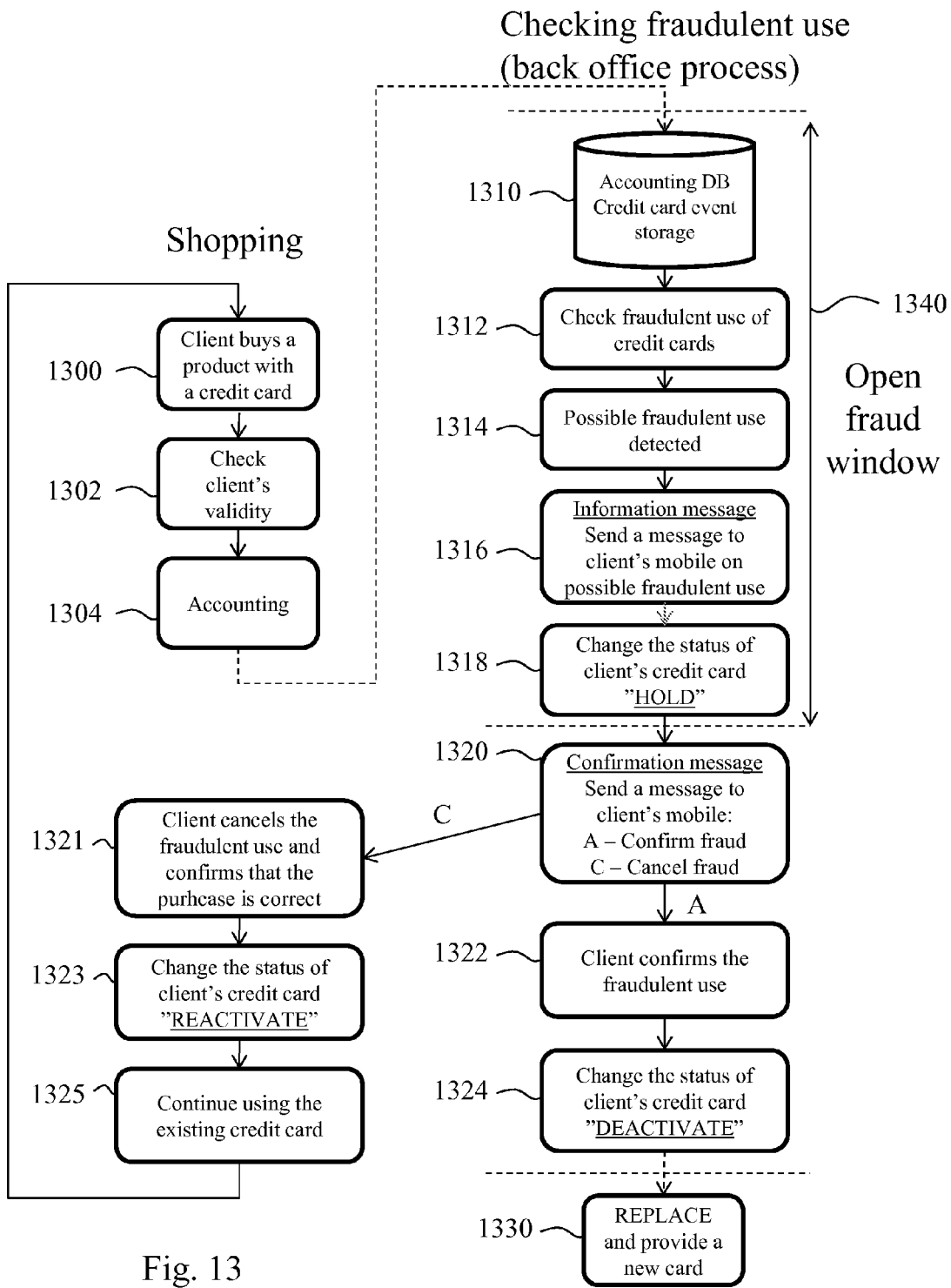
FIG. 13 shows a flow diagram of a credit card paying process and a process for checking fraudulent use of credit cards with an "inform+hold" back office process for temporary blocking option of credit cards according to an embodiment of the invention.

Referring to FIG. 13 the process is similar to that of the example described with respect to FIG. 12. The actual shopping process starts with a phase 1300 when a client buys a product or service with a credit card. In this example the client's validity to use the credit is checked (1302). This can be done by giving a PIN-number or similar security code, after which the purchase event can be transferred to an accounting process (1304). It should be noted that this example is possible for point-of-sale as well as internet shopping.

As described above, credit card issuers typically store all purchase events in an accounting database (1310). Fraudulent use of credit cards is continuously followed-up in a back office process where all of the accounting information on credit card events is scanned against predetermined rules (1312). This is a system initiated fraud check process. The predetermined rules may include, for example, when an individual purchase sum exceeds a predetermined limit. Also when a credit card has been used geographically within too wide an area in a too short a time limit, which may be an indication of fraudulent use. Further, a change in the shopping behavior compared to earlier use may trigger a fraud investigation. There can be many other criteria which are recognized by those of ordinary skill in the art and any combination thereof which can be used as a trigger to investigate fraudulent use of credit cards.

When a possibly fraudulent use is detected (1314) the back office process, for example via a mediator, generates an information message (1316) to the client's mobile phone. The information message can be for example:

Dear Mr. Salonen, according to our back office processes we have noticed that your credit card may have been recently used fraudulently. Your credit card will be temporarily unavailable. Please wait for upcoming instructions or contact your issuer.

After sending the information message/alert the mediator changes (1318) the status of client's credit card to a "hold" status (or "pending" as described in the example and FIG. 7 above). This action is temporary and only valid through the investigation process of fraudulent use. During this period credit cards are at hold status and invalid or inactive for any normal use (i.e. paying). To change the status to "hold" can be accomplished using any of a variety of methods, several of which are enumerated herein. One effective way is to generate an artificial purchase or a temporary excess of credit limit on the credit card account. It should be noted that the credit card is still valid but temporarily unavailable. According to embodiment a confirmation message (1320) is sent to client's mobile phone which may take the following form:

Dear Mr. Salonen, your credit card is on hold and temporary unavailable due to suspicion of fraudulent use. Your credit card was used to purchase office supplies on 27 Mar. 2010 for 299 euros. Please reply
a—to confirm the fraud or
c—to cancel the fraud and accept the payment on VISA xxxx xxxx xxxx 123

In a case where the client responds with ("A") confirming the fraud (1322) the mediator or system behind it will change the status of the credit card by, for instance, deactivating the card permanently (1324). There may be still one or more messages, rounds of messages or message pairs for confirming the fraudulent use. After this phase the old credit card is invalid and the issuer will replace and provide a new card to client (1330).

In a case where the client responds with ("C") cancelling the fraud (1321) the system will change the status of the credit card by reactivating the credit card as valid (1323). There may be still one or more messages, rounds of messages or message pairs for confirming the cancellation of fraudulent use. After this phase the existing credit card is valid and ready for use immediately, or without undue delay (1325). With the aid of this path issuers can save huge amounts of money in cases where the credit card needs only to be reactivated. With the aid of the mediator and Dynamic Dialog Matrix described herein this can be handled very quickly with a high degree of security and in a convenient manner for the client. The messages in this example can be, for example, an SMS, MMS, e-mail, calendar reservation, software application, pop-up application or similar application that can be used within a mobile phone.

In the example a typical fraud window (1340) can be only some matter of minutes and the closing of the open fraud window can be totally independent of the client's actions.

Figure 14:
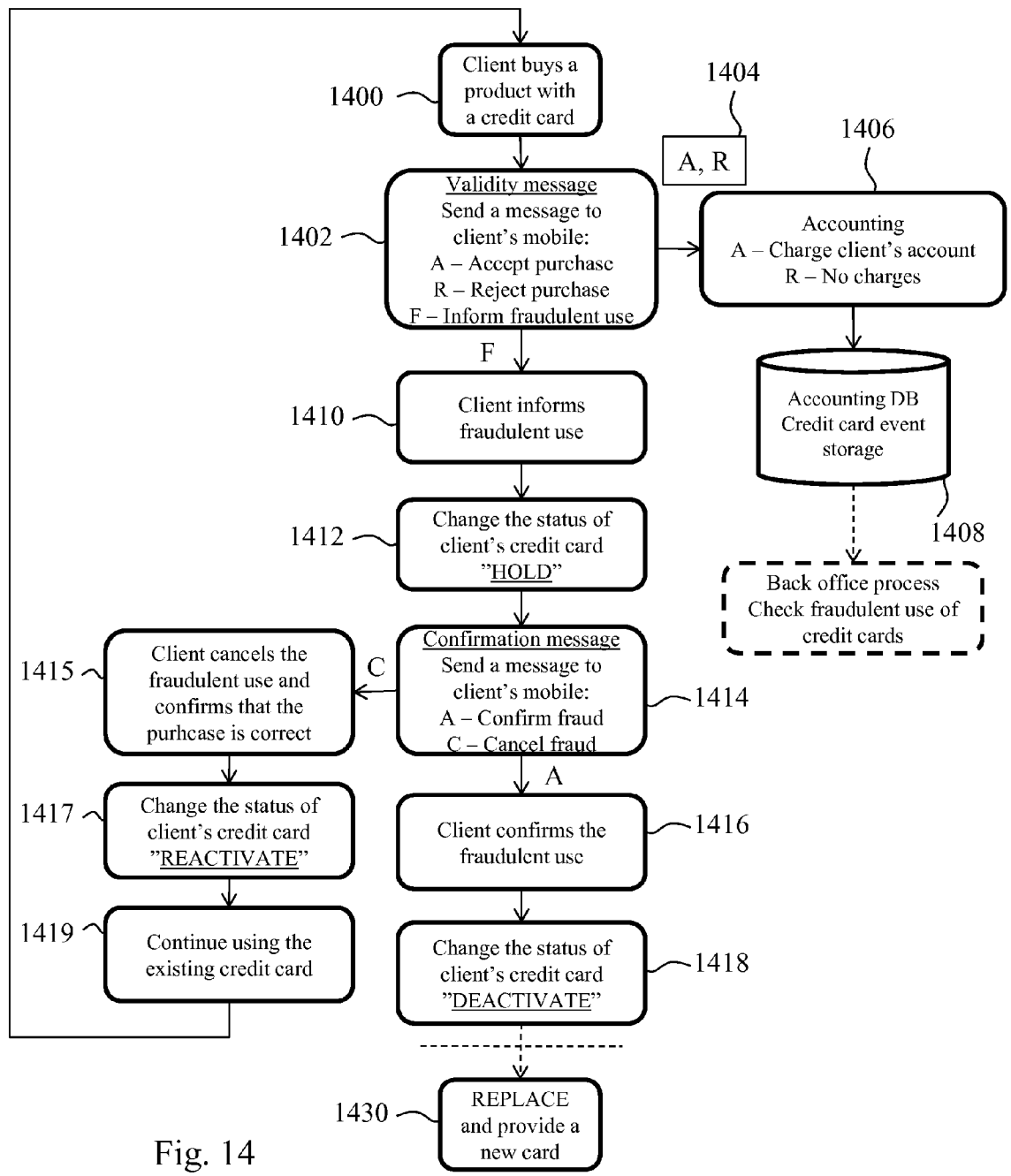
FIG. 14 shows a flow diagram of a credit card paying process and a process for checking fraudulent use of credit cards with an "always on, immediate hold" eMobile process for temporary blocking option of credit cards according to an embodiment of the invention.

Now referring to FIG. 14 wherein according to an embodiment of the invention no open fraud window is available. The actual shopping process starts with a phase 1400 when a client buys a product or service with a credit card or other payment vehicle. In this example the system, preferably a mediator, sends a validity message to the client's mobile phone (1402). It should be noted that this example is possible for point-of-sale as well as internet shopping. The validity message can take the following form:

Dear Mr. Salonen, your credit card was used to purchase office supplies on 27 Mar. 2010 for 299 euros. Please reply
a—to accept the purchase on VISA xxxx xxxx xxxx 123
r—to reject the purchase or
f—to report a fraud on your credit card.

In a case where the client decides to respond either "A" or "R" (1404) the mediator transmits the purchase event information in the accounting (1406). The accounting information is stored in a database (1408) from which a back office processes can be executed as told, for example, within the examples referring to FIGS. 12 and 13.

In a case where the client responds with "F" to informing a fraudulent use of their credit card (1410) the mediator informs the system to change the status of client's credit card to a "hold" status (or "pending" as described in the example and FIG. 7 above) 1412. This is a client initiated fraud check process. This action is temporary and only valid through the investigation process of fraudulent use. During this period credit cards are at hold status and invalid or inactive for any normal use (i.e. paying). As told above to change the status as "hold" can be done several of methods. One effective way is to generate an artificial purchase or a temporary excess of credit limit on the credit card account. It should be noted that the credit card is still valid but temporarily unavailable.

According to an embodiment a confirmation message (1414) is sent to client's mobile phone which may take the form of: Dear Mr. Salonen, your credit card is on hold and temporary unavailable due to suspicion of fraudulent use. Your credit card was used to purchase office supplies on 27 Mar. 2010 for 299 euros. Please reply
a—to confirm the fraud or
c—to cancel the fraud and accept the payment on VISA xxxx xxxx xxxx 123

In a case where the client responds with ("A") confirming the fraud (1416) the mediator or system behind it will change the status of the credit card by deactivating it permanently (1418). There may be still one round of message pairs for confirming the fraudulent use. After this phase the old credit card is invalid and the issuer will replace and provide a new card to client (1430).

In a case where the client responds with ("C") cancelling the fraud (1415) the system will change the status of the credit card by reactivating the credit card as valid (1417). There may be still one or more messages, round of messages or message pairs for confirming the cancellation of fraudulent use. After this phase the existing credit card is valid and ready for use immediately (1419). With aid of this path issuers save huge amounts of money in the cases where the credit cards need only to be reactivated. With aid of the mediator and Dynamic Dialog Matrix as described herein this can be handled very quickly and with a high degree of reliability and security as well as in a very convenient way for client. The messages in this example can be, for example, SMS, MMS, e-mail, calendar reservation, software application, pop-up application or similar application that can be used within a mobile phone.

In this example the validation of use is done by a client's mobile phone with the possibility to inform of fraud where preferably no fraud window is available.

Figure 15:
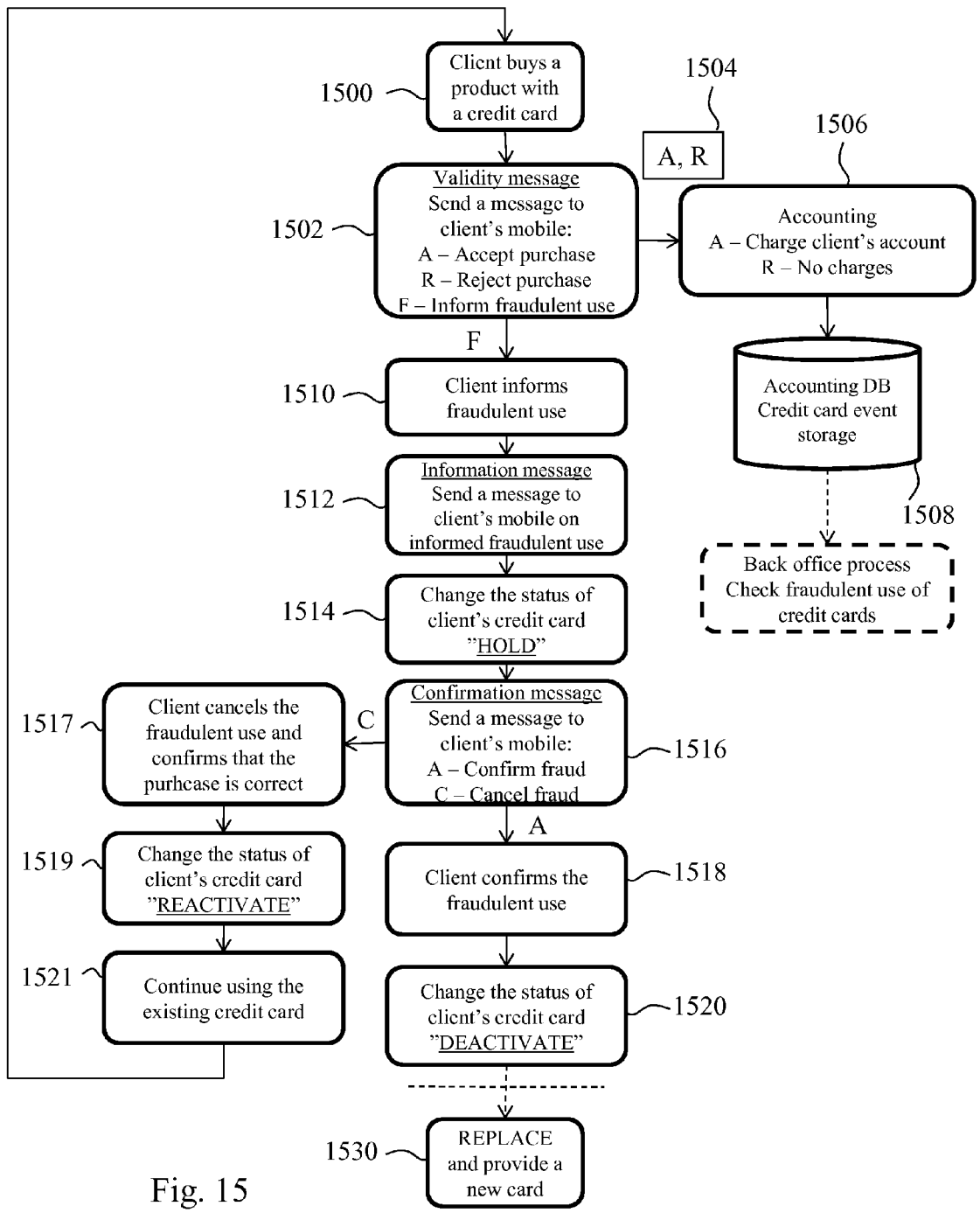
FIG. 15 shows a flow diagram of a credit card paying process and a process for checking fraudulent use of credit cards with an "always on, inform+hold" eMobile process for temporary blocking option of credit cards according to an embodiment of the invention.

Referring to FIG. 15 wherein according to an embodiment of the present invention no open fraud window is available. The actual shopping process starts with a phase 1500 when a client buys a product or service with a credit card or other payment vehicle. In this example the system, preferably mediator, sends a validity message to client's mobile phone (1502). It should be noted that this example is possible for point-of-sale as well as internet shopping. The validity message can take, for instance, the following form:
Dear Mr. Salonen, your credit card was used to purchase office supplies on 27 Mar. 2010 for 299 euros. Please reply
a—to accept the purchase on VISA xxxx xxxx xxxx 123
r—to reject the purchase or
f—to report a fraud on your credit card.

In a case where the client decides to respond either "A" or "R" (1504) the mediator transmits the purchase event information in the accounting process (1506). The accounting information is stored in a database (1508) from which a back office processes can be executed, for example as described with respect to FIGS. 12 and 13.

In a case where the client responds with "F" to inform of a fraudulent use of their credit card (1510) the mediator will send an information message (1512) to a client's mobile phone or mobile device. This is a client initiated fraud check process. The information message can take the form of:
Dear Mr. Salonen, you have informed us of a fraudulently use of your credit card. Your credit card will be temporarily unavailable. Please wait for upcoming instructions or contact your issuer.

After sending the information message the mediator changes the status of client's credit card to a "hold" status (or "pending" as described in the example and FIG. 7 above) 1514. This is a client initiated fraud check process. This action is temporary and only preferably only valid through the investigation process of fraudulent use. During this period credit cards are at hold status and invalid or inactive for any normal use (e.g. paying). As told above to change the status as "hold" can be done several of methods. One effective way is to generate an artificial purchase or a temporary excess of credit limit on the credit card account. It should be noted that the credit card is still valid but temporarily unavailable. According to embodiment a confirmation message (1516) is sent to client's mobile phone which may take the form of:
Dear Mr. Salonen, your credit card is on hold and temporary unavailable due to your information of fraudulent use. Your credit card was used to purchase office supplies on 27 Mar. 2010 for 299 euros. Please reply
a—to confirm the fraud or
c—to cancel the fraud and accept the payment on VISA xxxx xxxx xxxx 123

In case the client responds with ("A") confirming the fraud (1518) the mediator or system behind it will change the status of the credit card by deactivating it permanently (1520). There may be still one or more messages, rounds of messages or message pairs for confirming the fraudulent use. After this phase the old credit card is invalid and the issuer will replace and provide a new card to client (1530).

In case the client responds with ("C") cancelling the fraud (1517) the system will change the status of the credit card by reactivating the credit card as valid (1519). There may be still one or more messages, rounds of messages or message pairs for confirming the cancellation of fraudulent use. After this phase the existing credit card is valid and ready for use immediately (1521). With aid of this path issuers can save huge amount of money in the cases where the credit cards need only to be reactivated. With the aid of the mediator and Dynamic Dialog Matrix as described herein this can be handled very quickly and with a high degree of reliability and security as well as in very convenient way for client. The messages in this example can be, for example, SMS, MMS, e-mail, calendar reservation, software application, pop-up application or similar application that can be used within a mobile phone.

In this example the validation of use is done by client's mobile phone or mobile device with the possibility to inform fraud while preferably no fraud window is available.

Figure 16:
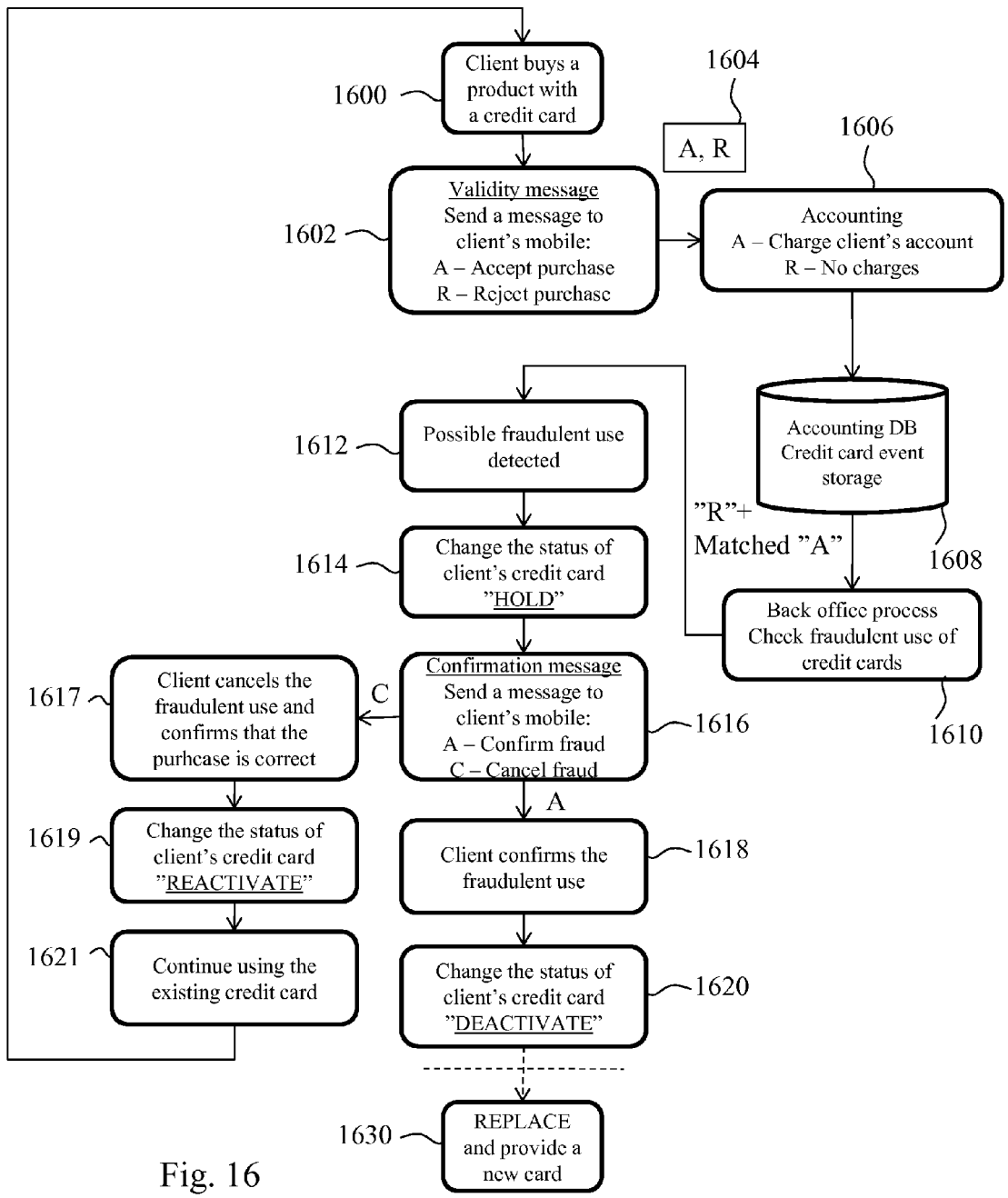
FIG. 16 shows a flow diagram of a credit card paying process and a process for checking fraudulent use of credit cards with a "fraud trigger detection, immediate hold" process for temporary blocking option of credit cards according to an embodiment of the invention.

Now referring to FIG. 16 wherein a mobile phone validation is presented according to an embodiment of the invention. The actual shopping process starts with a phase 1600 when a client buys a product or service with a credit card or other payment vehicle. In this example the system, preferably a mediator, sends a validity message to a client's mobile phone (1602). It should be noted that this example is possible for point-of-sale as well as internet shopping. The validity message can, for example, take the following form:
Dear Mr. Salonen, your credit card was used to purchase office supplies on 27 Mar. 2010 for 299 euros. Please reply
a—to accept the purchase on VISA xxxx xxxx xxxx 123 or
r—to reject the purchase In both of the cases where the client responds with, for example, "A" and "R" (1604) the mediator transmits the purchase event information in the accounting process (1606). The accounting information is stored in a database (1608) from which a back office process (1610) may execute continuous or intermittent fraud checking. In this example all the "R" responses are sent, preferably directly and/or immediately, into a fraudulent use check. Also, the "A" responded events matching certain predetermined rules, for example but not limited to those described above, can also be check for fraudulent activity. This is a system initiated fraud check process.

When a possibly fraudulent use is detected (1612) the back office process immediately changes (1614) the status of client's credit card to a "hold" status (or "pending" as described in the example and FIG. 7 above). This action is preferably temporary and only valid through the investigation process of fraudulent use. During this period credit cards are at hold status and invalid or inactive for any normal use (e.g. paying). To change the status to "hold" can be done via several methods. One effective way is to generate an artificial purchase or a temporary excess of credit limit on the credit card account. It should be noted that the credit card is still valid but temporarily unavailable. According to embodiment a confirmation message (1616) is sent to client's mobile phone which may take the following form:

Dear Mr. Salonen, your credit card is on hold and temporary unavailable due to suspicion of fraudulent use. Your credit card was used to purchase Office on 27 Mar. 2010 for 299 euros. Please reply
a—to confirm the fraud or
c—to cancel the fraud and accept the payment on VISA xxxx xxxx xxxx 123

In the case the client responds with ("A") confirming the fraud (1618) the mediator or system behind it will change the status of the credit card by preferably deactivating it permanently (1620). There may be still one or more messages, rounds of messages or message pairs for confirming the fraudulent use. After this phase the old credit card is invalid and the issuer will replace and provide a new card to client (1630).

In the case the client responds with ("C") cancelling the fraud (1617) the system will change the status of the credit card by reactivating the credit card as valid (1619). There may be still one or more messages, rounds of messages or message pairs for confirming the cancellation of fraudulent use. After this phase the existing credit card is valid and ready for use immediately (1621). With aid of this path issuers can save huge amount of money in the cases where the credit cards need only to be reactivated. With aid of the mediator and Dynamic Dialog Matrix as described herein this can be handled very quickly and with a high degree of reliability and security as well as in a very convienent manner for the client. The messages in this example can be, for example, SMS, MMS, e-mail, calendar reservation, software application, pop-up application or similar application that can be used within a mobile phone.

Figure 17:
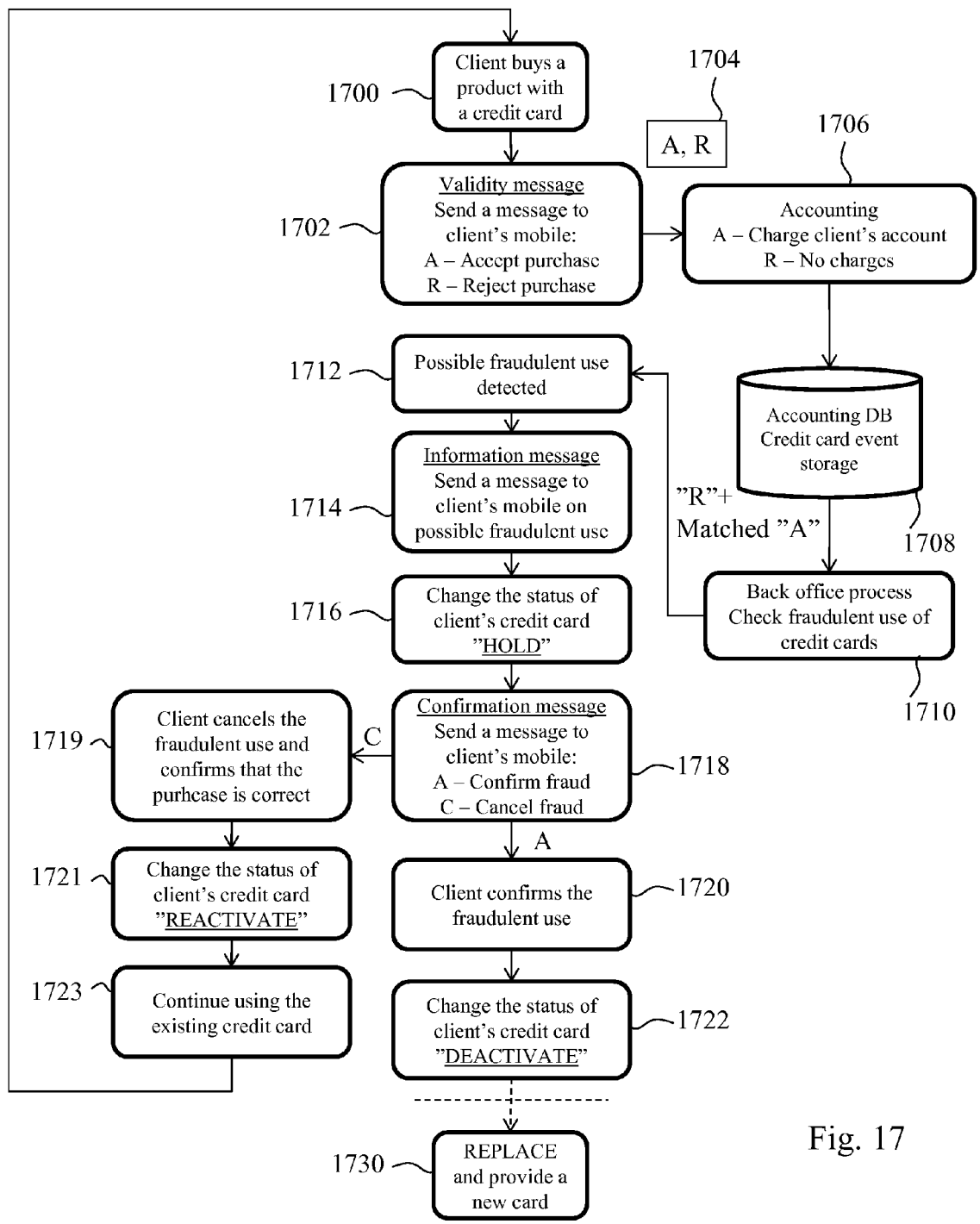
FIG. 17 shows a flow diagram of a credit card paying process and a process for checking fraudulent use of credit cards with a "fraud trigger detection, inform+hold" process temporary blocking option of credit cards according to an embodiment of the invention.

Referring to FIG. 17 wherein a mobile phone validation is presented according to an embodiment of the invention. The actual shopping process starts with a phase 1700 when a client buys a product or service with a credit card. In this example the system, preferably a mediator, sends a validity message to client's mobile phone or mobile device (1702). It should be noted that this example is possible for point-of-sale as well as internet shopping. The validity message may take the following form:

Dear Mr. Salonen, your credit card was used to purchase office supplies on 27 Mar. 2010 for 299 euros. Please reply
a—to accept the purchase on VISA xxxx xxxx xxxx 123 or
r—to reject the purchase
In both cases where the client replies with "A" and "R" (1704) the mediator transmits the purchase event information in the accounting process (1706). The accounting information can be stored in a database (1708) from which a back office process (1710) executes continuous or discontinuous fraud checking. In this example all the "R" responds can be placed straight into the fraudulent use check. Also the "A" responded events matching one or more predetermined rules of fraudulent check may cause the system to continue with the following fraud check message process with the client. This is a system initiated fraud check process.

When a possibly fraudulent use is detected (1712) the back office process, preferably via the mediator, generates an information message (1714) to client's mobile phone. The information message may take the form of:

Dear Mr. Salonen, according to our back office processes we have noticed that your credit card may be fraudulently used. Your credit card will be temporarily unavailable. Please wait for upcoming instructions or contact your issuer.

Before, during and/or after sending the information message the mediator changes (1716) the status of client's credit card to "hold" status (or "pending" as described in the example and FIG. 7 above). This action is preferably temporary and only valid through the investigation process of fraudulent use. During this period credit cards are at hold status and invalid or inactive for any normal use (e.g. paying). To change the status to "hold" can be done via several methods. One effective way is to generate an artificial purchase or a temporary excess of credit limit on the credit card account. It should be noted that the credit card is still valid but temporarily unavailable. According to an embodiment a message (1718) is sent to the client's mobile phone, said message may take the following form:

Dear Mr. Salonen, your credit card is on hold and temporary unavailable due to suspicion of fraudulent use. Your credit card was used to purchase office supplies on 27 Mar. 2010 for 299 euros. Please reply
a—to confirm the fraud or
c—to cancel the fraud and accept the payment on VISA xxxx xxxx xxxx 123

In a case where the client responds with ("A") confirming the fraud (1720) the mediator, or system behind it, will change the status of the credit card by deactivating it permanently (1722). There may be still one or more messages, rounds of messages or message pairs for confirming the fraudulent use. After this phase the old credit card is invalid and the issuer will replace and provide a new card to client (1730).

In a case where the client responds with ("C") cancelling the fraud (1719) the system will change the status of the credit card by reactivating the credit card as valid (1721). There may be still one or more messages, rounds of messages or message pairs for confirming the cancellation of fraudulent use. After this phase the existing credit card is valid and ready for use immediately (1723). With aid of this path issuers can save huge amount of money in the cases where the credit cards need only to be reactivated. With the aid of the mediator and Dynamic Dialog Matrix described herein this can be handled very quickly a high degree of reliability and security for the client. The messages in this example can be, for example, SMS, MMS, e-mail, calendar reservation, software application, pop-up application or similar application that can be used within a mobile phone.

The management of sent and received messages from the examples associated with FIGS. 9-17 is preferably done in a manner as described in the application herein, more specifically, for example, with respect to a Dynamic Dialog Matrix. As an example, in order to assure a high level of security and reliable authentication, when multiple messages are sent to a user to confirm or refute a possibly fraudulent event it is preferable that at least two of the messages come from different reply addresses. More particularly, it is advantageous if at least two replies from the client in any of the dialogs discussed with respect to the examples above are expected at least two different reply addresses. Furthermore, it certain embodiments only a moderate degree of authentication may be required or preferred. In such embodiments it can be advantageous to utilize a Dynamic Dialog Matrix with at least two, and preferably a plurality of, different reply addresses which each message may originate from. In such embodiments, once a dialog is initiated with a client the reply address used in any subsequent messages may not change. However, as a client would be unlikely to know or predict the number which the original message would originate from (in the case of a plurality of available reply addresses) a moderate added level of security can be provided.

While the examples discussed in relation to the FIGS. 9-17 have been described as discrete embodiments one of ordinary skill will realize the utility in combining aspects of certain examples in further embodiments. The examples provided herein are not meant to be limiting in nature but merely to offer several discrete examples which are representative of the invention as a whole. Those of ordinary skill in the art will recognize countless modifications and combinations of the disclosed examples without departing from the scope of the present invention. As a further example to this, the messages sent in any given embodiment may come from multiple sources. Such multiple sources may be different 10 digit long numbers, different short numbers, different types of addresses such as some coming from A-subscriber numbers and some coming from email addresses.

Furthermore, while the discrete examples are mainly directed to a client using a credit card and receiving messages to a mobile phone, one of ordinary skill in the art will recognize numerous other payment vehicles which are equally appropriate for utilization with the present invention, such as but not limited to, debit cards, loyalty cards, direct transfers, direct bank debits, paypal transactions, etc. Additionally, clients may use one or more mobile devices in place of or in combination with a mobile telephone. Such devices can be, but are not limited to, a tablet computer, a tablet reader, an e-reader, a PDA, a laptop computer or the like.

Additionally, while the examples are described above with a set of interested parties (i.e. the issuer, mediator, service provider and acquirer), one of ordinary skill in the art will recognize that there may be one or more intermediaries not explicitly herein mentioned but which do not affect or substantially destroy the underlying processes. Similarly, two or more of the parties described herein may be essentially the same entity which performs more than one of the described tasks. Such modifications of the present described system do not fall outside of the scope of the present invention.

According to an embodiment of the present invention there is described herein an implementation to manage and update credit card holder's basic information such as, for example, their address, phone number, mobile phone number, loyalty point system and/or adding a new payment cards to the issuer's system. As the number of different payment cards and loyalty cards in people's wallets increases differentiation under a certain business segment becomes a more and more important role within, for example service providers, banks, credit card companies and the like. According to an embodiment of the invention, both adding a new card and combining cards together can be done in convenient method which uses a registration page of the issuer. After registration a secure and authenticated dialog can be initiated by contacting to client's mobile phone, for example. The management and update of cards can be done during a dialog of accepting/rejecting payments or during fraud prevention checking as well.

As an example, contact information can be updated in a manner as follows (or in a similar format):
Sender: Issuer X
Dear Jukka Salonen, this is an automatic warning message sent by Issuer X due to exceptional purchasing events or behavior on your payment card. Within this service a misuse of payment card can be avoided. According to our register we hold the following information:
Name: Jukka Salonen
Address: Lampitie 57, Nurmijarvi.
Phone number: +358 400 312 311
Please, reply
c—if the information is correct
w—if the information is wrong
If the card holder replies with "C" the dialog can continue with a confirmation which may take the following form:
Thank you for your reply. We want to confirm that associated to this mobile phone number you have the following payment cards:
VISA xxxx xxxx xxxx 1234
Eurocard yyyy yyyy yyyy 4321
Please, confirm by replying
y—Yes, all the cards are listed within this telephone
n—No, the information of the cards are incorrect
a—Add a new card within this telephone
If the card holder chooses either "N" or "A" then a further dialog will be initiated to correct or complete the card information. In the case the card holder chooses "Y" the next information message can be sent to the card holder, such as:
Issuer X: Updated Registration Information:
Jukka Salonen
Lampitie 57, Nurmijarvi
VISA xxxx xxxx xxxx 1234
Eurocard yyyy yyyy yyyy 4321
Please, reply
c—to confirm the updated registration information
m—to modify the updated registration information
a—to add more cards within this telephone
An embodiment of the present invention as described above can be further characterized as a method for detecting fraudulent use of payment vehicle (e.g. credit card, debit card, direct debit, check, direct transfer, paypal transaction other internet based transaction, other mobile banking based transaction), which include one or more of the following steps; client conducting a purchase and/or a purchase attempt (e.g. by using a computer, tablet, iPhone, mobile phone, internet application or Point-Of-Sale), client paying and/or attempting to pay with said payment vehicle, seller receiving information involved with the purchase (e.g. product, product code, invoice identifier, price, payment card number, payment vehicle identification, similar information, part of any of said example pieces of information and/or a combination thereof) and providing the information to a first entity (e.g. the card issuer, an acquirer, a mediator, a responsible third party) either directly or through at least one further entity (e.g. the card issuer, an acquirer, a mediator, a responsible third party), said first entity checking at least some of the purchase information alone or together with further information from an accounting database (e.g. information about and/or derived from predetermined fraud checking rules); determining if the further information and/or purchase information meets one or more predetermined fraud checking rules, wherein in response to a fraudulent or possibly fraudulent determination further performing one or more of the following steps; changing the status of the client's payment vehicle to be temporarily inactive (e.g. generating an artificial event by an excess of credit limit or an excess of an individual purchase limit or other applicable method or means), generating a first message (said first message may or may not be the actual first message sent to a client but is herein in the context of the embodiment referred to as such) containing at least one of; a portion of the previously stated information, an indication of possibly fraudulent use of the payment vehicle and a selection of at least one choice to be answered, sending the first message to the client's mobile device, wherein the client receives or is at least capable of receiving the first message with said mobile device and/or an auxiliary device, said client chooses one choice of the selection and/or an appropriate response and transmits an answer to the first message, wherein if the answer from the client indicates fraudulent use, possible fraudulent use and/or otherwise not definitively authentic use of the client's payment vehicle further sending at least one second message to said client's mobile device for receiving a confirmation (e.g. of fraudulent use or authentic use). Any of said methods or combination of methods may comprise one or more further steps relating to changing the status of one or more payment vehicles (e.g. placing a card or payment vehicle on hold, active, passive, deactivated, etc.). Any of said methods or combination of methods may comprise further steps relating to temporarily, semi-permanently or permanently blocking the payment vehicle. Furthermore, any of said methods or combination of said methods can be implemented by one or more processors of one or more computing devices (e.g. mediator, server, computer, computing device, cloud), wherein said one or more processors is controlled by one or more transitory or non-transitory computer readable storage mediums having stored thereon instructions for causing said one or more processors to perform some or all of the method steps referred to above.

EXAMPLE 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:
Please choose one of the following departure times:
6:00 a.m., answer A
7:30 a.m., answer B
8:15 a.m., answer C.
If none of these is OK, answer D.
Sender: +358440844 027
Please choose ticket class:
First class, answer A
Business class, answer B
Economy class, answer C
Cheapest available, answer D
Sender: +358440844 011
Please choose:
Window seat, answer A
Aisle seat, answer C
Sender: +358440844 034
Please select the meal:
Vegetarian, answer A
Beef answer B
Chicken, answer C
Sender: +358440844 003

The answers received from the customer to the preceding questions and several others were
'A' to question with ref no +358 440 844 027
'D' to question with ref no +358 440 844 011
'A' to question with ref no +358 440 844 034
'B' to question with ref no +358 440 844 003
'D' to question with ref no +358 440 859 751
'A' to question with ref no +358 440 844 277
'C' to question with ref no +358 440 841 368
From this, the service provider can find out that the customer chose:
the first morning flight (=A),
cheapest available ticket (=D),
window seat (=A),
beef for meal (=B),
and etc.

It is important to note with the matrix the customer can answer the questions in any order, and can even fail to answer some questions. If these are relevant, the system can urge for an answer. If not, the system can proceed without this information.

Figure 8:
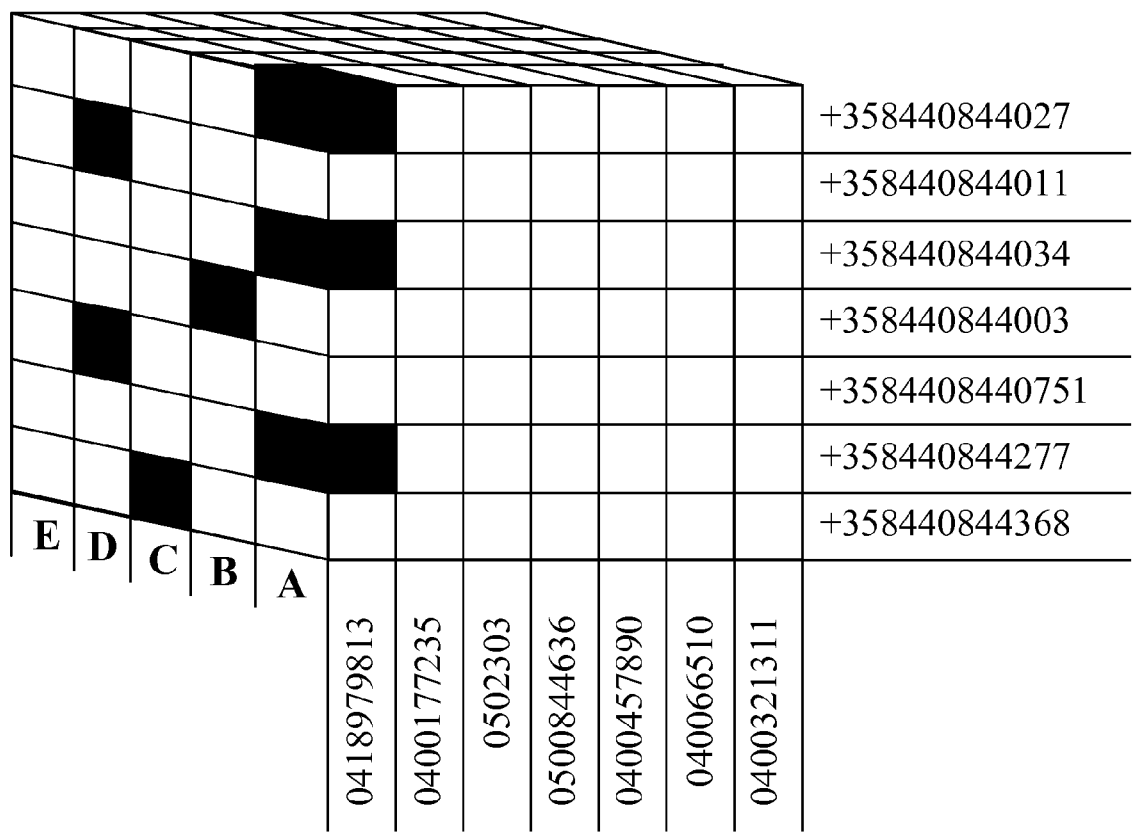
FIG. 8 shows a matrix diagram corresponding to Example 2, according to an embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

Similar series of messages can be used in conjunction with the authentication and verification as described above. For instance, if a software developer offers a 30-day trial version of their software they can require that a user enters a mobile number to activate the software. Then, based on a triggering event, a mediator can send a desired message to the user. Examples of triggering events are that the developer asks whether the installation succeeded, that the trial period is ending or has ended, that the user has not used the software for a certain period of time or the user has recently used the software. One example would be if the triggering event was that the trial period was ending the mediator could send a series of messages as follows:

You have downloaded a trial version of our software and the trial period has ended.
Please reply if you
A: did not have time to adequately test the software and would like more time,
B: would like to purchase a full version of the software or
C: would not like to continue using the software.

By responding "A" to the message the user could receive a code to enter in to the software which would give the user an additional period of time for trial. Because the software is linked to the user's mobile number from the initial activation, the mediator will know when this period runs out that it has already been extended and may not offer that option next time the trial period ends. Additionally, if someone else tried to send "A" to the number from their own mobile number the mediator would know that they had not activated any software and would know not to send any extension codes. If the user would like to purchase a full version then the user could respond with "B" and then pay and be authenticated through their mobile device as described above. If the user replies with "C" then a series of messages constituting a survey could be sent in order to help the software developer determine why the user did not want to purchase their product. Furthermore, in return for, or in response to certain answers, the mediator could send a code as a reward to the user. Again, since the mobile number of the user is tied to the software the mediator prevents other people with other mobile numbers to send a message "C" to the software developer's number in order to receive a reward. Further, other user's do not know from which number the software developer has sent the message.

An embodiment of the present invention is a method for authenticating a user having a known address comprising the steps of sending a first message to the known address from a first reply address, receiving a reply to the first message from the known address to the first reply address, sending a second message to the known address from a second reply address, receiving a reply to the second message from the known address to the second reply address, authenticating the user based on the received replies from the known address, and wherein the first and second reply addresses are selected from a plurality of available reply addresses. Additionally, the method in accordance with the embodiment may further comprise the steps of; receiving a request to authenticate a user at a known address prior to sending the first message, and sending the authentication determination to the party that requested the authentication. A method in accordance with the embodiments may also include wherein one or more additional messages are sent to the known address. A method in accordance with the embodiments may also include wherein once a reply address is selected from the plurality of available reply addresses it becomes unavailable for future selection as a reply address to the known address. A method in accordance with the embodiments may also include wherein each reply address is randomly selected from the plurality of available reply addresses. A method in accordance with the embodiments may also include wherein at least one of the messages includes an authentication question and at least one of the subsequent replies includes an answer to said authentication question. A method in accordance with the embodiments may also include wherein authenticating the user includes determining an authentication level based on the number of the plurality of available reply addresses and/or the replies to at least one of the messages. A method in accordance with the embodiments may also include wherein the authentication is additionally based on the time between sending a message and receiving the corresponding reply. A method in accordance with the embodiments may also include wherein the known address and at least a portion of the plurality of reply addresses are telephone or mobile phone numbers.

Another embodiment of the present invention is a method of software activation which comprises associating each software distribution with a unique activation code, providing a user who downloads the software with said activation code, the activation code being sent to an identifiable electronic device, retrieving information related to the identifiable electronic device and associating the activation code with the identifiable electronic device to obtain a fingerprint of said activation, storing said fingerprint including the activation code and information of the identifiable electronic device and authorizing subsequent activation of the software only to said user with said identifiable electronic device information.

Another embodiment of the present invention is a system for authenticating a user having a known address comprising; a plurality of available reply addresses a means for sending messages having one of the plurality of reply addresses a means for receiving replies to the reply addresses, and a controller configured to send a first message to the known address from a first reply address, send a second message to the known address from a second reply address and to authenticating the user based on received replies from the known address to the reply addresses.

Although the present invention has been described in considerable detail with reference to certain preferred versions thereof, other versions are possible. For example, the user's known address can be an email address or mobile telephone address as described above or it can be an online account name, such as a log-in ID. Many online accounts have 2-way and multi-way messaging features where messages are addressed to the online account name or a derivative thereof. In such instances, the present invention can be implemented with the messaging system of online account and the user's online account name. Therefore the spirit and scope of the appended claims should not be limited to the preferred versions herein.

The invention claimed is:
1. A method comprising performing actions on a server computer system that communicates with at least one telecommunications network, the method comprising:
performing communications relating to a potentially fraudulent transaction, the potentially fraudulent transaction involving at least one specific payment vehicle of a client and a mobile communications device, the communications device having at least one address, wherein the at least one specific payment vehicle and the at least one address are associated with the client, wherein the performing communications comprises:
receiving and/or determining information pertaining to the potentially fraudulent transaction,
generating a message to be sent based on the information on the potentially fraudulent transaction,
causing the generated message to be sent to the mobile communications device's address from a first reply address, wherein, prior to sending the generated message, a plurality of currently available reply addresses is determined, a reply address is selected for the generated message from the plurality of currently available reply addresses, and the selected reply address is used as the first reply address, receiving a response from the mobile communications device's address;

positively validating the response from the mobile communications device's address only if the response was sent to the first reply address, which was selected from the plurality of possible reply addresses;

determining if the content of the positively validated response to the first reply address confirms a suspicion of fraudulent activity, and temporarily limiting usability of the payment vehicle until the suspicion of fraudulent activity is removed.

2. The method of claim 1, further comprising causing one or more additional messages to be sent to the mobile device from a second reply address, the second reply address being selected from the same plurality of possible reply addresses as the first reply address.

3. The method of claim 2, wherein the second reply address is selected from the same plurality of possible reply addresses as the first reply address with the exception of the first reply address.

4. The method of claim 2, wherein the content of the one or more messages is chosen based off of the reply, or lack of reply, from the mobile device to the first message.

5. The method of claim 1, further comprising determining if a response to the second reply address confirms the suspicion of fraudulent activity includes determining if the response to the first or second reply address is sent to the first or second reply address from the mobile device address.

6. The method of claim 5, further comprising determining an assurance level for the confirmation based on the replies to the first and one or more second messages.

7. The method of claim 5, wherein the determination includes determining if the response to the second reply address contains a valid response option confirming or rejecting the suspicion of fraudulent activity.

8. The method of claim 1, further comprising monitoring a multiplicity of reply addresses which are currently available, selecting a reply address from the multiplicity of currently available reply addresses, and using the selected reply address as a reply address.

9. The method of claim 1, wherein determining if a response to the first reply address confirms the suspicion of fraudulent activity includes determining if the response to the first reply address is sent to the first reply address from the mobile device address and/or if the response to the first reply address contains a valid response option confirming or rejecting the suspicion of fraudulent activity.

10. A server computer system comprising a processor system, wherein the server computer system:

communicates with at least one telecommunications network;

performs communications relating to a potentially fraudulent transaction, the potentially fraudulent transaction involving at least one specific payment vehicle of a client and a mobile communications device, wherein the mobile communications device has at least one address, and wherein the at least one specific payment vehicle and the at least one address are associated with the client, wherein the performing communications comprises:

receiving and/or determining information pertaining to the potentially fraudulent transaction, generating a message to be sent based on the information on the potentially fraudulent transaction, causing the generated message to be sent to the mobile communications device's address from a first reply address, which is selected, prior to sending the generated message, from a plurality of possible reply addresses from which the server computer system is capable of sending messages and at which the server computer system is capable of receiving responses, receiving a response from the mobile communications device's address;

determining if the content of the positively validated response to the first reply address confirms suspicion of fraudulent activity, temporarily limiting the usability of said payment vehicle until the suspicion of fraudulent activity is removed.

11. The server computer system of claim 10, wherein the server computer system is configured to send one or more messages to the mobile device's address and, based on at least one reply to the one or more messages, register and/or update information about the client.

12. The server computer system of claim 10, wherein the updating the information about the client is performed in a third party database and/or by a payment vehicle issuer in an internal database.

13. The server computer system of claim 10, wherein the server computer system determines if the response to the first reply address is sent to the first reply address from the mobile device address and/or if the response to the first reply address contains a valid response option confirming or rejecting the suspicion of fraudulent activity.

14. The server computer system of claim 10, wherein the server computer system causes one or more additional messages to be sent to the mobile device from a second reply address, the second reply address being selected from the same plurality of possible reply addresses as the first reply address.

15. The server computer system of claim 10, wherein the server computer system determines if a response to the second reply address confirms the suspicion of fraudulent activity includes determining if the response to the first or second reply address is sent to the first or second reply address from the mobile device address.

16. The server computer system of claim 10, wherein the server computer system determines an assurance level for the confirmation based on the replies to the first and one or more second messages.

17. The server computer system of claim 10, wherein the server computer system determines if the response to the second reply address contains a valid response option confirming or rejecting the suspicion of fraudulent activity.

18. The server computer system of claim 10, wherein the second reply address is selected from the same plurality of possible reply addresses as the first reply address with the exception of the first reply address.

19. The server computer system of claim 10, wherein the content of the one or more messages is chosen based on the reply, or lack of reply, from the mobile device to the first message.

20. The server computer system of claim 10, wherein determining if the response to the first reply address confirms fraudulent activity includes determining if the response is a suitable response for the sent message.

21. The server computer system of claim 10, wherein temporarily limiting the usability of the payment vehicle is performed prior to, after and/or in conjunction with sending the first message.

22. A method comprising performing actions on a server computer system that communicates with at least one telecommunications network, the method comprising:
  performing communications relating to a potentially fraudulent transaction, the potentially fraudulent transaction involving at least one specific payment vehicle of a client and a mobile communications device, the communications device having at least one address, wherein the at least one specific payment vehicle and the at least one address are associated with the client,
  wherein said performing communications comprises:
  receiving and/or determining information pertaining to the potentially fraudulent transaction,
  generating a message to be sent based on the information on the potentially fraudulent transaction,
  causing the message to be sent to the mobile communications device's address from a first reply address, which is selected, prior to sending the generated message, from a plurality of possible reply addresses from which the server computer system is capable of sending messages and at which the server computer system is capable of receiving responses,
  receiving a response from the mobile communications device's address;
  positively validating the response from the mobile communications device's address only if the response was sent to the first reply address, which was selected from the plurality of possible reply addresses;
  determining if the content of the positively validated response to the first reply address confirms the suspicion of fraudulent activity, and
  temporarily limiting the usability of said payment vehicle until said suspicion of fraudulent activity is removed.

23. The method of claim 22, further comprising sending one or more messages to the mobile device's address and, based on at least one reply to the one or more messages, registering and/or updating information about the client.

24. The method of claim 23, wherein the updating the information about the client is performed by a mediator in a third party database and/or by a payment vehicle issuer in an internal database.

25. The method of claim 22, wherein determining if the response to the first reply address confirms fraudulent activity includes determining if the response is a suitable response for the sent message.

26. The method of claim 22, further comprising accessing the mobile device's address by sending a request to a third-party to retrieve the mobile device address.

27. The method of claim 22, further comprising accessing the mobile device's address by retrieving the mobile device address from a database accessible by a mediator.

28. The method of claim 22, wherein temporarily limiting the usability of the payment vehicle is done prior to, after and/or in conjunction with sending the first message.

29. A server computer system comprising a processor system, wherein the server computer system:
  communicates with at least one telecommunications network;
  performs communications relating to a potentially fraudulent transaction, the potentially fraudulent transaction involving at least one specific payment vehicle of a client and a mobile communications device, wherein the mobile communications device has at least one address, and wherein the at least one specific payment vehicle and the at least one address are associated with the client,
  wherein the performing communications comprises:
  receiving and/or determining information pertaining to the potentially fraudulent transaction,
  generating a message to be sent based on the information on the potentially fraudulent transaction,
  causing the generated message to be sent to the mobile communications device's address from a first reply address, which is selected, prior to sending the generated message, from a plurality of possible reply addresses from which the server computer system is capable of sending messages and at which the server computer system is capable of receiving responses,
  receiving a response from the mobile communications device's address;
  positively validating the response from the mobile communications device's address only if the response was sent to the first reply address, which was selected from the plurality of possible reply addresses;
  determining if the content of the positively validated response to the first reply address confirms suspicion of fraudulent activity, and
  temporarily limiting the usability of said payment vehicle until the suspicion of fraudulent activity is removed.

30. The server computer system of claim 29, wherein the server computer system monitors a multiplicity of reply addresses which are currently available to select a reply address from the multiplicity of currently available reply addresses and to use the selected reply address as a reply address.

31. The server computer system of claim 29, wherein the server computer system causes one or more additional messages to be sent to the mobile device from a second reply address, the second reply address being selected from the same plurality of possible reply addresses as the first reply address.

32. A non-transitory computer readable medium having stored thereon a set of instructions for causing a processor to perform the operations of:
  receiving and/or determining that a transaction via the payment vehicle may be of a fraudulent nature;
  generating a message to be sent to a client's mobile device based on a suspicion of fraudulent activity;
  causing the generated message to be sent to the mobile device's address from a first reply address, which is selected, prior to sending the generated message, from a plurality of possible reply addresses from which the server computer system is capable of sending messages and at which the server computer system is capable of receiving responses,
  positively validating the response from the mobile communications device's address only if the response was sent to the first reply address, which was selected from the plurality of possible reply addresses;
  determining if the content of the positively validated response to the first reply address confirms the suspicion of fraudulent activity; and
  temporarily limiting the usability of the payment vehicle until the suspicion of fraudulent activity is removed.

33. A non-transitory computer readable medium having stored thereon a set of instructions for causing a processor to perform the operations of:
  receiving and/or determining that a transaction via the payment vehicle may be of a fraudulent nature;
  generating a message to be sent to a client's mobile device based on a suspicion of fraudulent activity;

causing the generated message to be sent to the mobile device's address from a first reply address, which is selected, prior to sending the generated message, from a plurality of possible reply addresses from which the server computer system is capable of sending messages and at which the server computer system is capable of receiving responses, receiving a response from the mobile communications device's address;

positively validating the response from the mobile communications device's address only if the response was sent to the first reply address, which was selected from the plurality of possible reply addresses;

determining if the content of the positively validated response to the first reply address confirms the suspicion of fraudulent activity; and temporarily limiting the usability of the payment vehicle until the suspicion of fraudulent activity is removed.

\* \* \* \* \*